United States Patent [19]

Takahashi et al.

[11] Patent Number: 5,748,287
[45] Date of Patent: May 5, 1998

[54] PHOTOGRAPHIC FILM REPRODUCING APPARATUS USING OBJECT BRIGHTNESS AND EXPOSURE CORRECTION AMOUNT TO DEVELOP PHOTOGRAPHED IMAGES

[75] Inventors: Yoshiharu Takahashi; Yasutoshi Fujii; Keiichi Kawazu; Seiichi Isoguchi; Kohichi Yamaguchi; Katsuya Nagaishi, all of Hachioji, Japan

[73] Assignee: Konica Corporation, Tokyo, Japan

[21] Appl. No.: 566,888

[22] Filed: Dec. 4, 1995

[30] Foreign Application Priority Data

Dec. 9, 1994 [JP] Japan .................................. 6-306351
Dec. 9, 1994 [JP] Japan .................................. 6-306352

[51] Int. Cl.[6] .................................................. G03B 27/00
[52] U.S. Cl. ........................ 355/40; 355/38; 358/487; 358/527; 358/500; 358/506; 358/453
[58] Field of Search ............................ 355/38, 40

[56] References Cited

U.S. PATENT DOCUMENTS

| | | | |
|---|---|---|---|
| 5,043,758 | 8/1991 | Nealon ................................ | 355/40 |
| 5,130,745 | 7/1992 | Cloutier et al. ......................... | 355/40 |
| 5,477,353 | 12/1995 | Yamasaki ............................ | 355/487 |
| 5,517,271 | 5/1996 | Yamaguchi et al. .................. | 354/298 |
| 5,561,531 | 10/1996 | Funazaki ............................ | 358/500 |
| 5,574,577 | 11/1996 | Wally, Jr. et al. .................... | 358/487 |

*Primary Examiner*—R. L. Moses
*Assistant Examiner*—Shival Virmani
*Attorney, Agent, or Firm*—Finnegan, Henderson, Farabow, Garrett & Dunner, L.L.P.

[57] ABSTRACT

In an apparatus for reproducing a photographed image on each frame of a developed photographic roll film, wherein each frame includes an image region on which the photographed image is provided and a memory region in which information with regard to the photographed image is stored, an information reader for reading the information stored in the memory region; a processing circuit for processing image signals photoelectrically obtained by an image reader on the bases of the information; and the processed image signals are displayed on the screen.

11 Claims, 22 Drawing Sheets

301 — TO CONVERT PRINT CONTROL CORRECTION DATA TO RGB EACH COMPARATIVE DATA, $R_1$, $G_1$, $B_1$

302 — TO SELECT MATRIX FOR EACH FILM TYPE $$M = \begin{pmatrix} \alpha_{11}, & \alpha_{12}, & \alpha_{13}, \\ \alpha_{21}, & \alpha_{22}, & \alpha_{23}, \\ \alpha_{31}, & \alpha_{32}, & \alpha_{33} \end{pmatrix}, \quad M' = \begin{pmatrix} \alpha'_{11}, & \alpha'_{12}, & \alpha'_{13}, \\ \alpha'_{21}, & \alpha'_{22}, & \alpha'_{23}, \\ \alpha'_{31}, & \alpha'_{32}, & \alpha'_{33} \end{pmatrix}$$

$$M'' = \begin{pmatrix} \alpha''_{11}, & \alpha''_{12}, & \alpha''_{13}, \\ \alpha''_{21}, & \alpha''_{22}, & \alpha''_{23}, \\ \alpha''_{31}, & \alpha''_{32}, & \alpha''_{33} \end{pmatrix}$$

303 — TO CALCULATE $R_0$, $G_0$, AND $B_0$ WITH SELECTED MATRIX M $$\begin{pmatrix} R_0 \\ G_0 \\ B_0 \end{pmatrix} = \begin{pmatrix} \alpha_{11}, & \alpha_{12}, & \alpha_{13}, \\ \alpha_{21}, & \alpha_{22}, & \alpha_{23}, \\ \alpha_{31}, & \alpha_{32}, & \alpha_{33} \end{pmatrix} \begin{pmatrix} R_1 \\ G_1 \\ B_1 \end{pmatrix}$$

304 — TO CALCULATE EACH PIXEL USING OBTAINED $R_0$, $G_0$ AND $B_0$ $$R_1 = \frac{G_0}{R_6} \cdot R_1, \quad G_1 = G_1, \quad B_1 = \frac{G_0}{R_0} \cdot B_1$$

TO FLOW 105

PHOTOGRAPHIC FILM REPRODUCING APPARATUS USING OBJECT BRIGHTNESS AND EXPOSURE CORRECTION AMOUNT TO DEVELOP PHOTOGRAPHED IMAGES

BACKGROUND OF THE INVENTION

The present invention relates to a film image reproducing apparatus wherein an image recorded on a silver halide film is monitored on an image plane of a TV set or the like, and more particularly, to a film image reproducing apparatus utilizing photographing information recorded on a silver halide film in the course of photographing and print information.

Recently, P.C.T. Patent Publication Open to Public Inspection No. 501016/1992 (hereinafter referred to as P.C.T. Patent O.P.I Publication) discloses a photographic film wherein images are formed on the film and information of photographing and photographer's intentions are recorded on a magnetic recording medium provided on the film surface after being coded.

In addition, Japanese Patent O.P.I. Publication No. 113347/1992 discloses a photographic printing method utilizing both the information mentioned above and photometric data in the course of printing.

On the other hand, Japanese Patent O.P.I. Publication Nos. 75922/1993 and 242385/1994 disclose a film image reproducing apparatus wherein a developed film is subjected to photoelectric conversion by means of an image sensor and then is displayed on a TV monitor through a processing circuit. Some products of this film image reproducing apparatus are available on the market.

Further, as contents to be recorded on a film, date, object brightness (LV value), rear-light bias amount (rear-light correction amount), existence of flash radiation, camera-to-subject distance, subject position, focal length of a lens, highlight/shadow standard indication and color temperature are given in P.C.T. Patent O.P.I. Publication No. 501016/1992 and Japanese Patent O.P.I. Publication No. 113347/1992, and it is disclosed that print information are recorded in the course of print processing.

In a photographic system employing the aforementioned film and printer, the following three methods are considered as a method for using a film image reproducing apparatus.

As a first method, photographing and recording of information are made by the use of the film stated above, then photographic prints printed on the printer mentioned above by the use of information recorded on the film are returned to a user together with a processed negative, and the user enjoys the photographic prints and also enjoys the processed film using a film image reproducing apparatus.

As a second method, after performing photographing and recording of information by the use of the film stated above, film processing only is conducted first, then a user selects frames to be printed from the returned processed negatives using a film image reproducing apparatus, and then prints are made on the printer stated above in a photofinishing laboratory by the use of information recorded on the film to be returned again to the user.

As a third method, after performing photographing and recording of information by the use of the film stated above, film processing only is performed to be enjoyed on a TV monitor or the like through utilization of a film image reproducing apparatus.

However, the above-mentioned methods have the following problems.

In the case of the first method, even when prints intended by a user are obtained by the user, if photographing information for them can not be inputted in a film image reproducing apparatus, there will be generated a big difference between an image on a TV monitor and a photographic print.

In the case of the second method, if photographing information can not be inputted in a film image reproducing apparatus similarly to the case of the first method, it is not possible to expect finished photographic prints, and thereby the desirable frames to be printed can not be selected.

In the case of the third method, if photographing information can not be inputted in a film image reproducing apparatus similarly to the foregoing, each information becomes useless.

Namely, the problems mentioned above are caused when photographing information recorded on a film are not used effectively by a film image reproducing apparatus.

Therefore, the first object of the invention is to make photographing information recorded on a film to be used effectively by a film image reproducing apparatus.

In a photographic system employing the above-mentioned film and printer, when reproducing a processed film on a monitor such as a TV set by the use of a film image reproducing apparatus, processed films are classified into 4 types of combination in the following table, if they are classified in terms of existence of photographing information and print information.

TABLE 1

| Type | (1) | (2) | (3) | (4) |
| --- | --- | --- | --- | --- |
| Photographing information | No | Yes | No | Yes |
| Print information | No | No | Yes | Yes |

In the table, (1) represents an occasion wherein an information recording system is not utilized in the aforesaid system structured, (2) represents an occasion wherein print information is not recorded, or film processing only is performed, although information is recorded in a camera, (3) is an occasion wherein a camera having no function of recording information is used for photographing and a printer having a function of recording information is used for printing, and (4) is an occasion wherein information recording is made in a camera and print information is recorded in a printer. Even when information are recorded as in the foregoing, there are two cases including one wherein either one of photographing information and print information only is recorded and the other wherein both information are recorded.

With regard to color temperature, for example, among contents of information, a camera itself judges a light source for lighting and records using information detected on the camera. However, from the design viewpoint including requirements of camera cost and compactness, it is not possible to employ a highly accurate system, and it is feared accordingly that a camera misjudges and lacks reliability.

Therefore, information such as color temperature is different from other information in nature, and it is expected that print information determined by a highly accurate algorism based on photometric data obtained from a film image by the use of information in photographing, is higher in reliability rather than using the information in photographing. Therefore, the second object of the information is to utilize print information recorded on a film effectively.

SUMMARY OF THE INVENTION

The first object of the invention is attained in a film image reproducing apparatus wherein an image is photoelectrically read from a processed film on which images of plural frames and photographing information for each frame are recorded and image data (image signals) are outputted for reproducing the read image on a monitor, through the following constitutions.

(1) There is provided a reading means that reads the aforesaid photographing information and an image processing means that conducts image processing for changing display brightness of an image to be reproduced on a monitor based on subject brightness information which is one of the aforesaid photographing information.

(2) There is provided a reading means that reads the aforesaid photographing information and an image processing means that conducts image processing for changing display brightness of an image to be reproduced on a monitor based on exposure correction amount information which is one of the aforesaid photographing information.

(3) There is provided a reading means that reads the aforesaid photographing information and an image processing means that conducts image processing for determining display brightness of an image to be reproduced based on image data of a highly bright area extracted from the read image, when flash light usage information is included in the aforesaid photographing information.

(4) There is provided a reading means that reads the aforesaid photographing information and an image processing means that conducts image processing for determining display brightness of the aforesaid image to be reproduced based on image data selected and extracted from image data of a highly bright area extracted from the read image or from image data of a low brightness area, when at least one of rear-light information and highlight/shadow standard indication information is included in the aforesaid photographing information.

(5) There is provided a reading means that reads the aforesaid photographing information and an image processing means that conducts image processing for determining display brightness of an image to be reproduced based on image data of a subject extracted from the read images when subject position information is included in the aforesaid photographing information.

The second object of the invention can be attained by the following constitutions.

(6) A film image reproducing apparatus photoelectrically reading the aforesaid image from a processed film on which images of plural frames and print information for each frame are recorded and outputting image data for reproducing the read images on a monitor, wherein there is provided a reading means that reads the aforesaid print information and an image processing means that conducts hue adjustment processing for an image to be reproduced on a monitor based on color correction data which is one of the aforesaid print information.

(7) A film image reproducing apparatus photoelectrically reading the aforesaid image from a processed film on which images of plural frames and at least one of photographing information of each frame and print information are recorded and outputting image data for reproducing the read images on a monitor, wherein there is a reading means that reads the aforesaid photographing information and an image processing means that conducts hue adjustment processing based on print information and on recorded information when either one of light source information which is one of the aforesaid photographing information or color correction data which is one of the aforesaid print information is recorded, and conducts hue adjustment processing giving priority to the aforesaid color correction data when both of the aforesaid light source information and color correction data are recorded.

BRIEF DESCRIPTION OF THE DRAWINGS

FIGS. 5-1 and 5-2 are flow charts determining an exposure amount of CCD based on various photographing information.

FIGS. 17-1 and 17-2 are flow charts for determining exposure conditions of CCD from CCD image data.

FIG. 18 is a flow chart for conducting hue adjustment based on color correction data.

DETAILED DESCRIPTION OF THE PREFERRED EMBODIMENT

An example of the invention will be explained in detail as follows, referring to FIGS. 1–8.

A film and a camera used in the invention are the same as those disclosed in Japanese Patent O.P.I. Publication No. 113347/1992, and a film has a magnetic band (a magnetic recording region) outside its photographing image plane (an image region) and a camera is equipped with a magnetic head capable of recording photographing information on the magnetic band or capable of reproducing. Contents to be recorded are the same as those disclosed in Japanese Patent O.P.I. Publication No. 113347/1992 and P.C.T. Patent Publication O.P.I. No. 501016/1992. As photographing information in the present example, light source information, photographing date, shutter speed, stop value, subject brightness, existence of exposure correction, existence of electronic flash, existence of rear-light photographing, existence of highlight/shadow standard indication, camera-to-subject distance and focal length can be properly recorded magnetically by a camera in the course of photographing, while as print information, color correction data, date of printing and information of photofinishing laboratory can be properly recorded magnetically by a printer in the course of printing.

Figure 1:
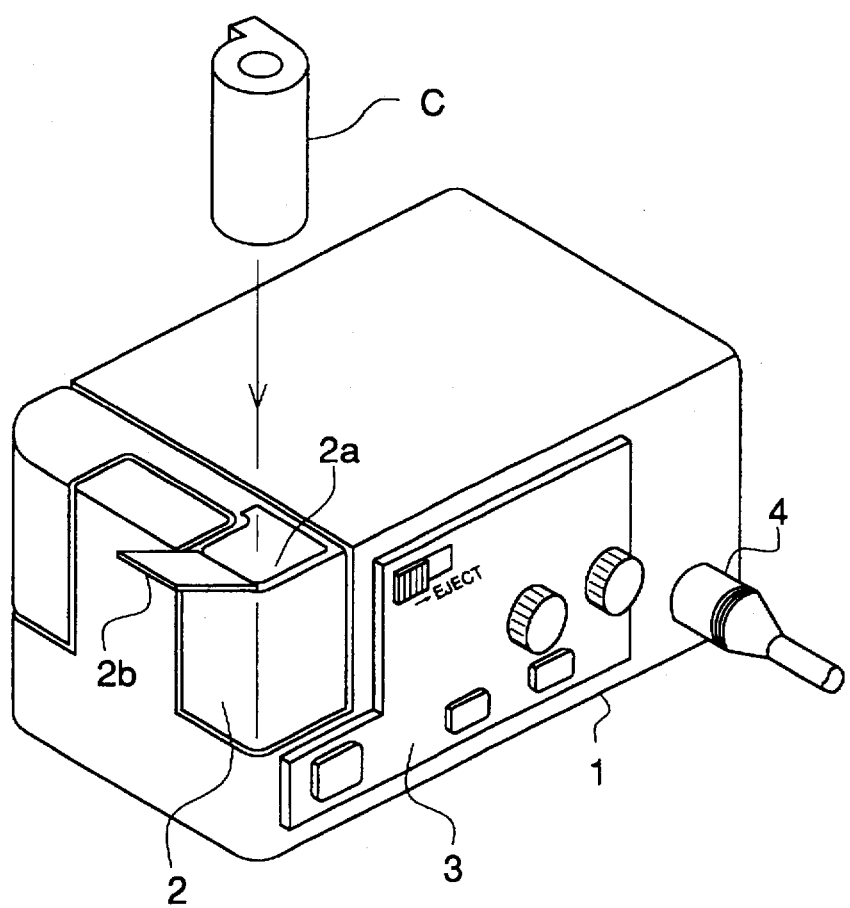
FIG. 1 is an appearance view of a film image reproducing apparatus.

FIG. 1 is an appearance view of a film image reproducing apparatus.

In film image reproducing apparatus 1, when cartridge C is loaded through cartridge loading section 2a of film transport section 2 and cover 2b is closed, a film is drawn out automatically and images on the film are subjected to photoelectric conversion one frame by one frame to be enjoyed on a monitor TV. After that, the film is taken up one frame by one frame. Such means for drawing out and taking up a film are built in the film transport section 2, but when a sleeve-shaped processed film which is not housed in cartridge C is used, the film transport section 2 can be removed. On operation section 3, it is possible to operate film transport, reversing of reproduced image, magnification and color, and output terminal 4 outputs image signals converted photoelectrically to an external monitor. Incidentally, the monitor can also be built in the present apparatus.

Figure 2:
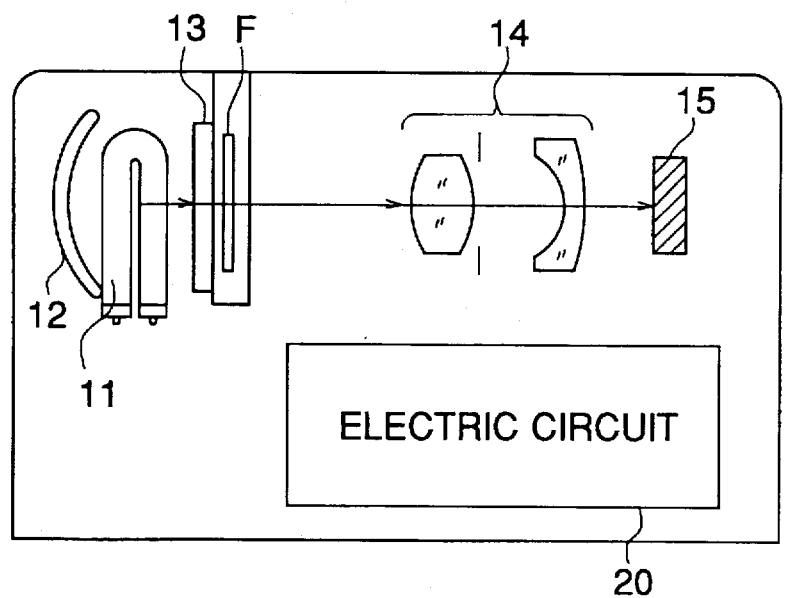
FIG. 2 is a sectional view of the inside of the film image reproducing apparatus.

FIG. 2 is a vertical sectional view of the inside of the film image reproducing apparatus.

On one side of film F taken out, there are arranged light source lamp 11 which is a lighting system for illuminating processed images on the film F, reflection mirror 12 for reflecting light irradiated by the light source lamp 11 on the rear portion, and milk-white diffusion plate 13 for illuminating film F uniformly, while on the other side thereof, there are arranged image-reading optics system 14 which is a zoom lens for reading images on film F and CCD 15 which is a photoelectric conversion element. In this way, images on film F are focused on CCD 15 by the image-reading optics system 14 and are converted photoelectrically. Incidentally, there are naturally arranged an infrared-cutting filter and a low-pass filter on the light-receiving surface of CCD 15. Under the optics system mentioned above, there is built in electric circuit 20 wherein various types of electric circuits are housed.

Figure 3:
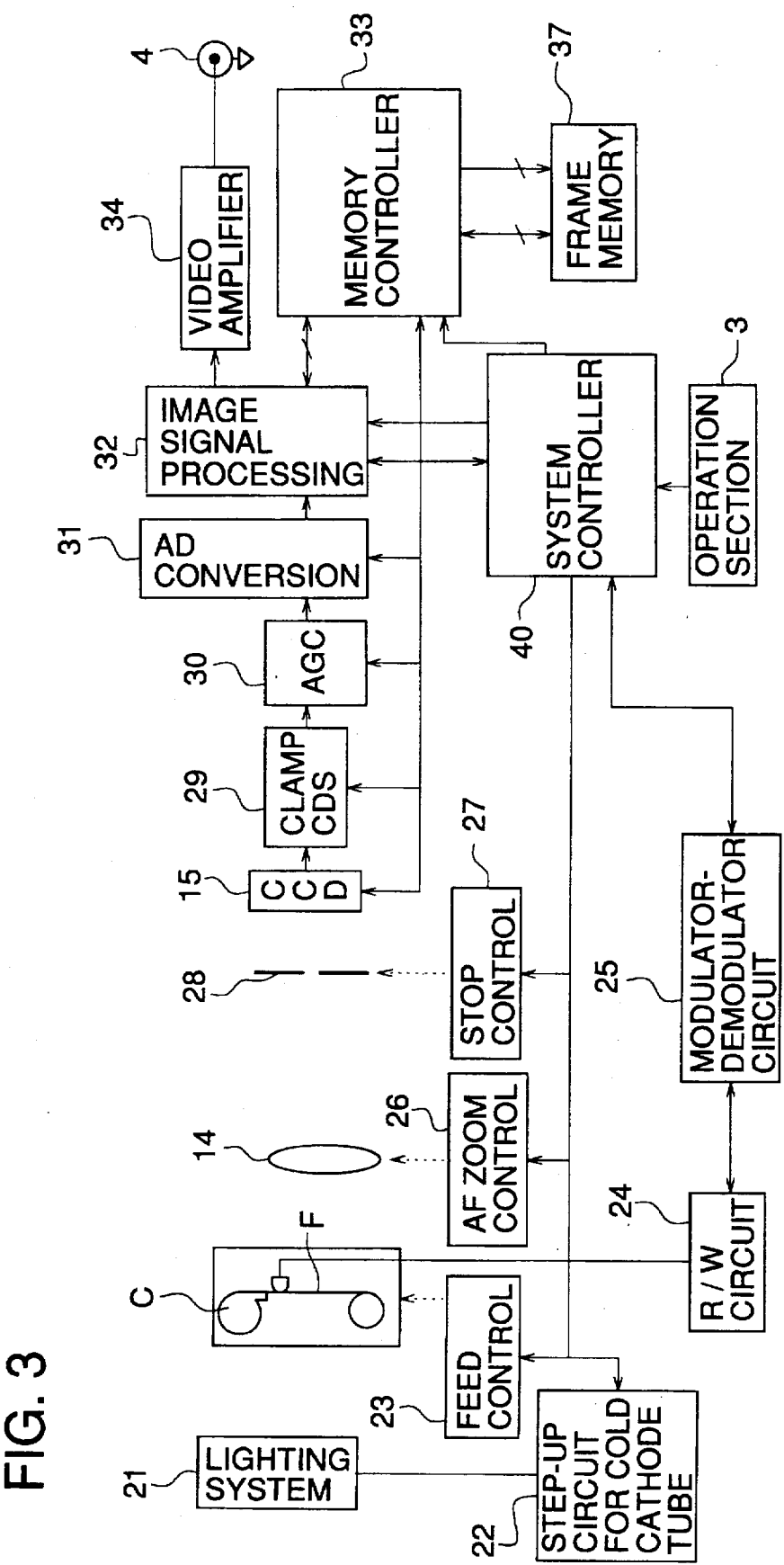
FIG. 3 is a block diagram of an electric circuit of the film image reproducing apparatus.

FIG. 3 is a block diagram of an electric circuit of a film image reproducing apparatus.

Lighting system 21 composed of light source lamp 11, reflection mirror 12 and diffusion plate 13 is driven by step-up circuit 22 for cold cathode ray tube that is controlled by system controller 40 composed of CPU.

Feed control section 23 draws out photographed film F from cartridge C by system controller 40, and controls the drawn out film F to be fed to the predetermined position.

Incidentally, in the present example, an unillustrated optical detecting element controls the position for film feeding.

R/W circuit 24 is driven by modulator-demodulator circuit 25 controlled by system controller 40 to read and write photographing information recorded on film F magnetically.

CCD 15 converts photoelectrically film images focused by image-sensing optics system 14 and outputs them as electrical signals.

AF zoom control section 26 is constituted with a D.C. motor, for example, and it drives image-sensing optics system 14 through the control by system controller 40 to change a lens distance of the image-sensing optics system 14 and thereby to change a focal length, and it further drives a lens for focusing in the image-sensing optics system 14 for focusing.

Stop control section 27 is constituted with an auto-iris, for example, and it changes optical stop 28 through the control by system controller 40. Incidentally, in the film image reproducing apparatus, main subjects are still images because they are film images, and therefore the variation of an amount of transmitted light is not so large compared with ordinary subjects. Therefore, it is also possible to adjust an amount of light as the so-called CCD electronic shutter.

In this case, the stop control section 27 is discontinued and a fixed stop is employed, while a CCD control circuit needs to be added to CCD 15.

Clamp CDS (correlation double sampling) section 29 performing preprocess and AGC amplifier 30 performing amplification for the first half conduct basic analog processing before AD conversion. It is also possible to change AGC standard gain of amplification for the first half through the control by system controller 40.

AD conversion section 31 converts analogic CCD output signals into digital data. Image signal processing section 32 performs video processing such as filter processing, coloring processing, knee-processing and color conversion processing on digitized CCD image data. Further, in the image signal processing section 32, there is built a DA converter, and it converts image signals inputted from CCD 15 and image data inputted reversely from memory controller 33 into analog signals, and it can also output to a monitor TV set through image output terminal 4 of video amplifier 34. Switching of these functions is conducted through data exchange with system controller 40, and it is also possible to output exposure information and focus information of CCD signals and white balance information to system controller 40, when necessary.

On the memory controller 33, digital image data inputted from image signal processing section 32 are stored in frame memory 37, or to the contrary, image data of the frame memory 37 are outputted to the image signal processing section 32. The frame memory 37 is an image memory capable of storing data for at least one image plane, and there are usually used VRAM, SRAM and DRAM, among which the VRAM capable of operating independently of a bus of system controller 40 is used in this particular case.

The system controller also controls a man/machine interface on operation section 3 of a film image reproducing apparatus main body.

Next, a series of operations of a film image reproducing apparatus will be explained briefly as follows.

Exposed film F housed in cartridge C is conveyed to a predetermined image taking position by feed control section 23 of film transport section 2. An image on the film conveyed to the predetermined image taking position is illuminated by lighting system 21 and focused on CCD 15 by image-sensing optics system 14.

Image signal processing section 32 receives an image input command from system controller 40, and operates CCD 15, clamp CDS section 29, AGC amplifier 30 and AD converting section 31 to accept image signals of film F representing a subject. After the image signals are subjected to basic video signal processing conducted in the image signal processing section 32, focus information are prepared from high frequency components of brightness data and exposure data are prepared from low frequency components thereof.

In the system controller 40, the data stated above are read from the image signal processing section 32, and stop control section 27 and AF zoom control section 26 are controlled at need, and further, the gain of AGC amplifier 30 is controlled for converging until appropriate exposure and focusing can be obtained. In this case, from the image signal processing section 32, analog image signals are outputted as NTSC signals to an external TV monitor from output terminal 4 through video amplifier 34.

Figure 20:
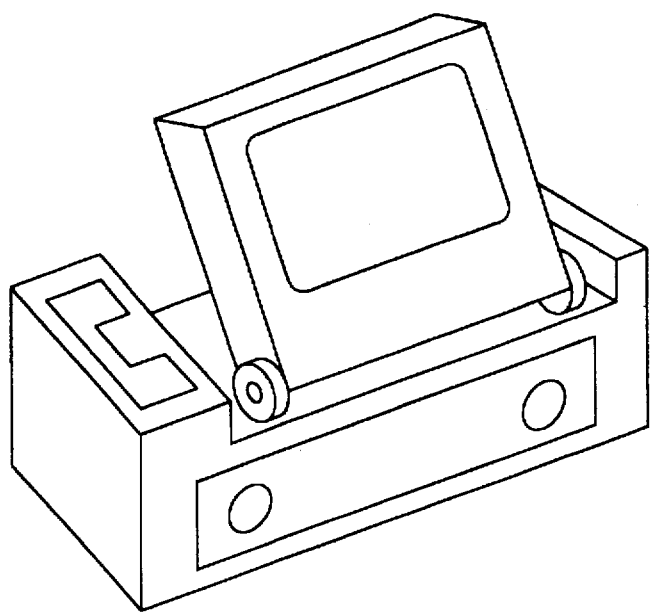
FIGS. 20A and 20B are perspective view showing a display unit respectively.
Figure 20:
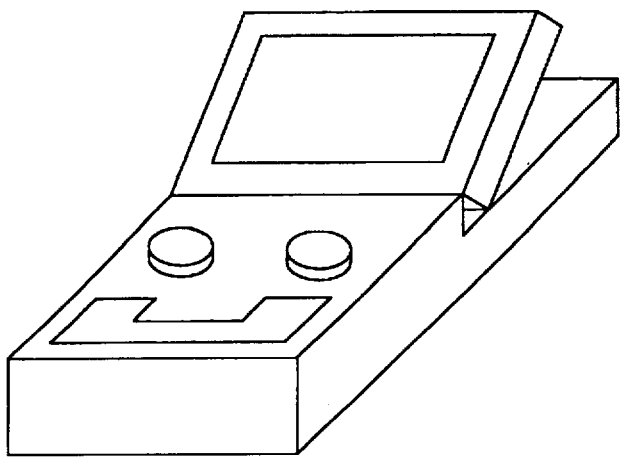

In the present example, an external TV monitor is employed as a reproducing apparatus. However, a monitor can also be built in the film image reproducing apparatus, naturally. For example, the reproducing apparatus and the monitor may be integrated in a single body in the form of a desk-top type as shown in FIG. 20A or a portable type as shown in FIG. 20B.

When signals showing that a rotary switch for rotating a vertical image to a horizontal image has been operated are inputted by operation section 3, system controller 40 outputs a command for taking-in to memory controller 33. Following this command, the memory controller 33 detects synchronized signals from the image signal processing section 32, and takes in image data of a YCrCb form or the like outputted at prescribed timing into frame memory 37. After finishing taking in images in the frame memory 37, memory controller 33 indicates a status showing completion of taking-in, and when the system controller 40 reads the status, it is detected that the images have been stored in the frame memory 37.

After that, a command for rotation is outputted from the system controller 40 to the memory controller 33, and sequence of reading a line and a row for data on the frame memory 37 is changed so that an image photographed vertically can be displayed vertically on a TV monitor by changing the length and the width.

Incidentally, by changing processing of the image signal processing section 32, an orange mask on a negative film varying from a maker to maker can be removed, and by controlling light source lamp 11, stop 28 and a shutter of CCD 15, a film image with improper exposure can be improved.

Figure 4:
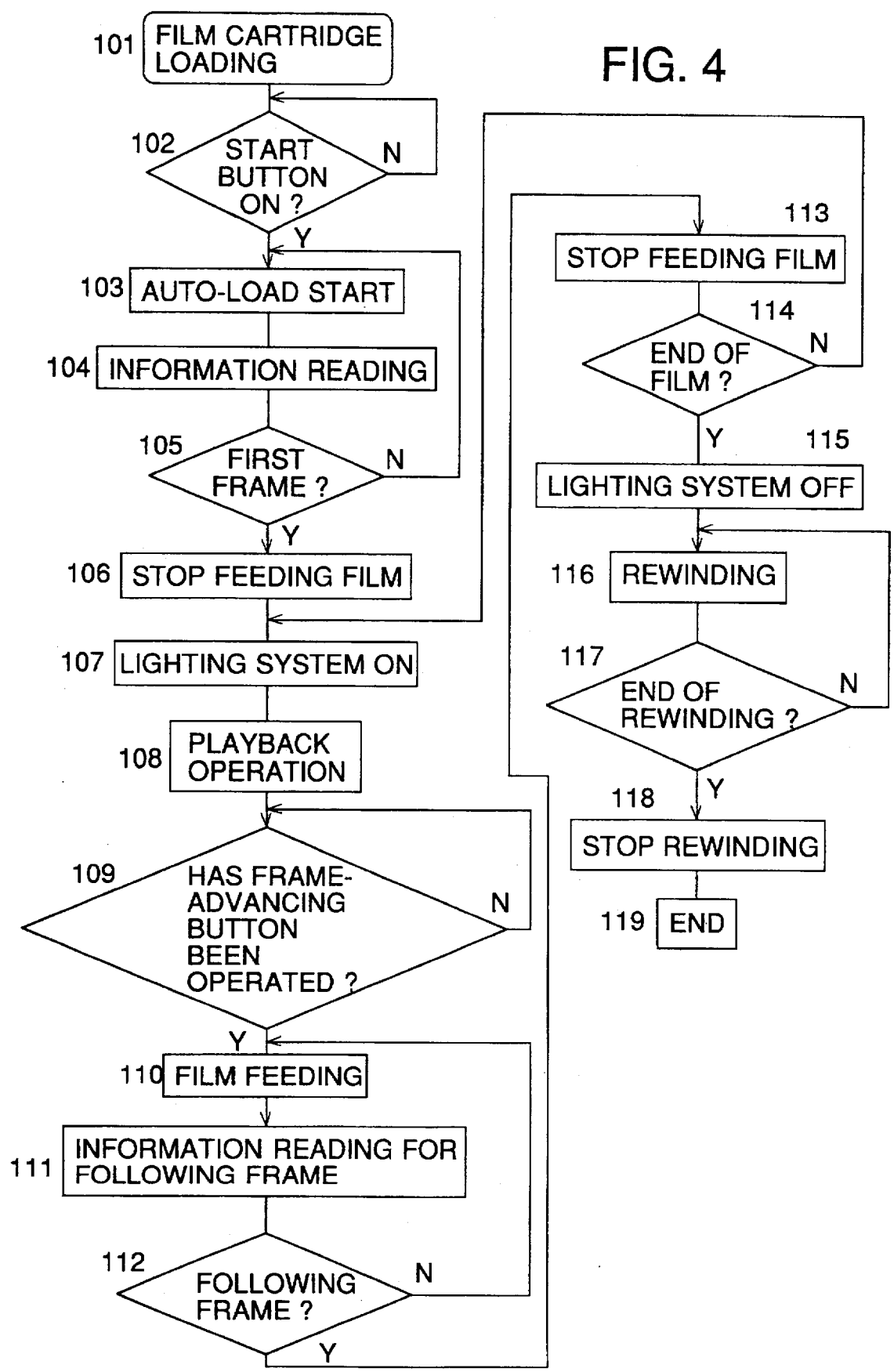
FIG. 4 is a flow chart of basic operations of the film image reproducing apparatus.

Next, a flow of basic operations of a film image reproducing apparatus used in the invention will be explained as follows, referring to a flow chart in FIG. 4.

After loading a cartridge in a film image reproducing apparatus (101), when a start button on an operation section is turned ON (102), an auto-load starts (103), a film is drawn out of the cartridge, and the film is taken up on a take-up reel. In the course of this film transport, information recorded on the film is read (104). The film transport is further continued, and when the first frame comes to a prescribed position (Y of 105), the film transport is stopped (106). After that, a lighting system is lit (107), and an operation of reproducing the first frame is conducted (108).

This reproducing operation includes a series of indications on a TV monitor including adjustment of brightness and hue which will be stated later.

Further, when a frame-advancing button on an operation section is operated (Y of 109), film transport for the following frame is started (110), and in the course of the film transport, information for the following frame is read (111). The film transport is further continued, and when the following frame comes to the prescribed position (Y of 112), the film transport is stopped (113), and reproducing operation is conducted. After repeating this cycle in succession, when the film is finished (Y of 114), a lighting system is put out (115), film rewinding is performed (116), and when the film has been rewound in a cartridge completely (Y of 117), film-rewinding is stopped (118) to reach the end (119).

Next, a flow to determine an exposure amount of CCD from various pieces of photographing information which is the first object of the invention will be explained as follows, referring to the flow chart in FIGS. 5-1 and 5-2. This is included in reproducing operation 108 in FIG. 4.

Figure 6:
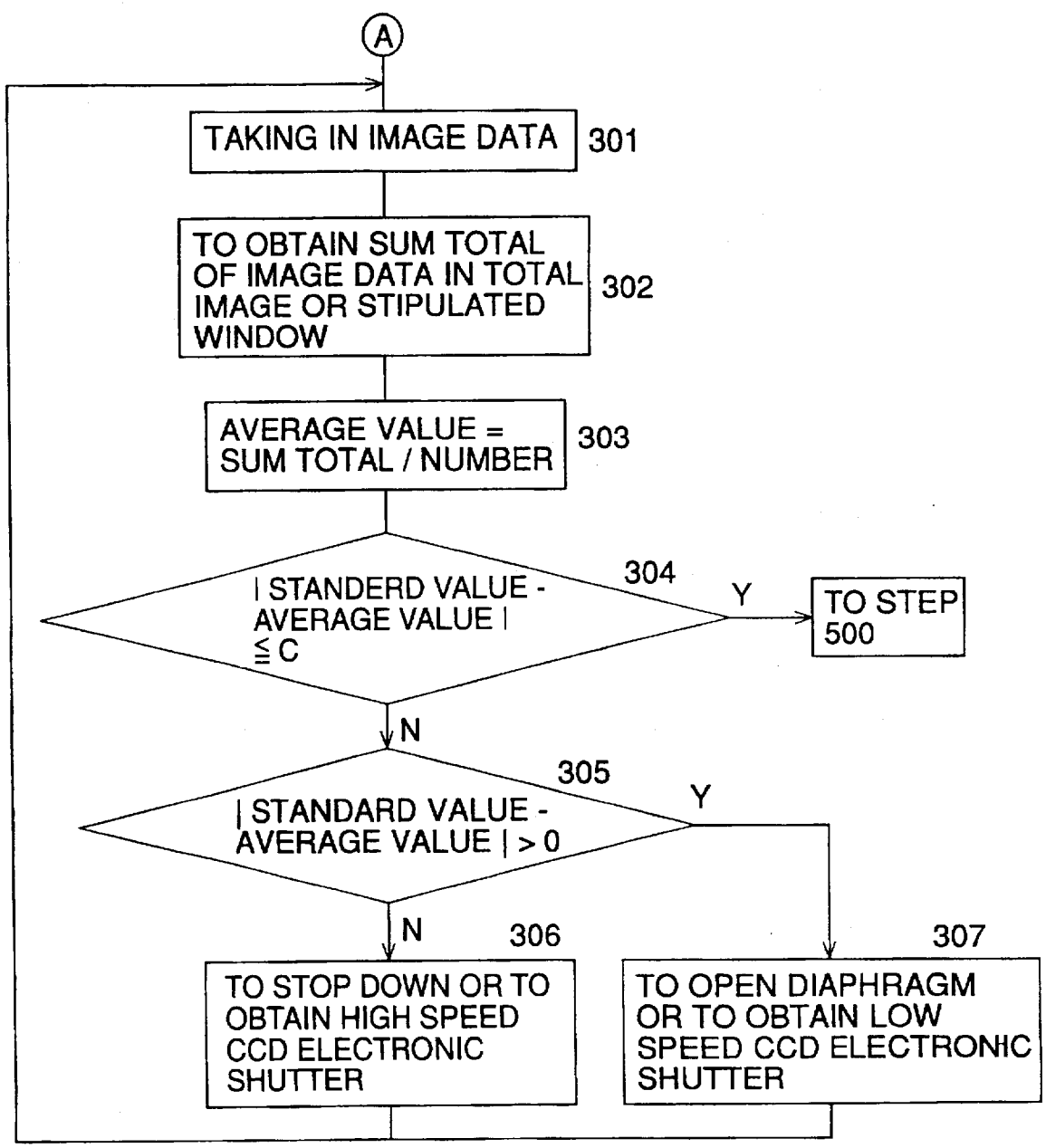
FIG. 6 is a flow chart determining an exposure amount of CCD when no photographing information is available.

First, whether photographing information is recorded on a film or not is confirmed, and when no photographing information is recorded (N of 201), the sequence advances to ①, then an average value of exposure amount in a total image plane or in a stipulated window is obtained, and deviation from the standard value is corrected by the stop value or by a CCD electronic shutter to control so that the CCD exposure amount may converge to the standard value. As shown in FIG. 6, when photographing information is not available at all, image data are taken in (301), and a sum total of CCD image data in a total image plane or in a stipulated window is obtained (302). CCD image data are indicated with digital data of 0–255 as 8 bits, namely with smaller output as zero, and an average value of output values is obtained (303) by dividing the aforesaid value with the number, and when a difference between the average value and a standard value obtained in advance experimentally, 128, for example, is smaller than a prescribed value (Y of 304), the stop value or a CCD electronic shutter is controlled without taking any action for determining an exposure amount of CCD. However, when a difference between an average value of output values and a standard value is large (N of 304), the average value of output values is compared with the standard value (305), and when the average value obtained is greater than the standard value (N of 305), the control is made in the direction to stop down or in the direction to the higher speed of CCD electronic shutter (306), while when the average value obtained is smaller than the standard value (Y of 305), the control is made in the direction to open the stop or in the direction toward the lower speed of CCD electronic shutter (307), thus the aforesaid flow is repeated until an average value of output values converges to the standard value.

Incidentally, exchange of these calculation and data is made between image signal processing section 32 and system controller 40. Various processing actions mentioned below are the same.

Figure 5:
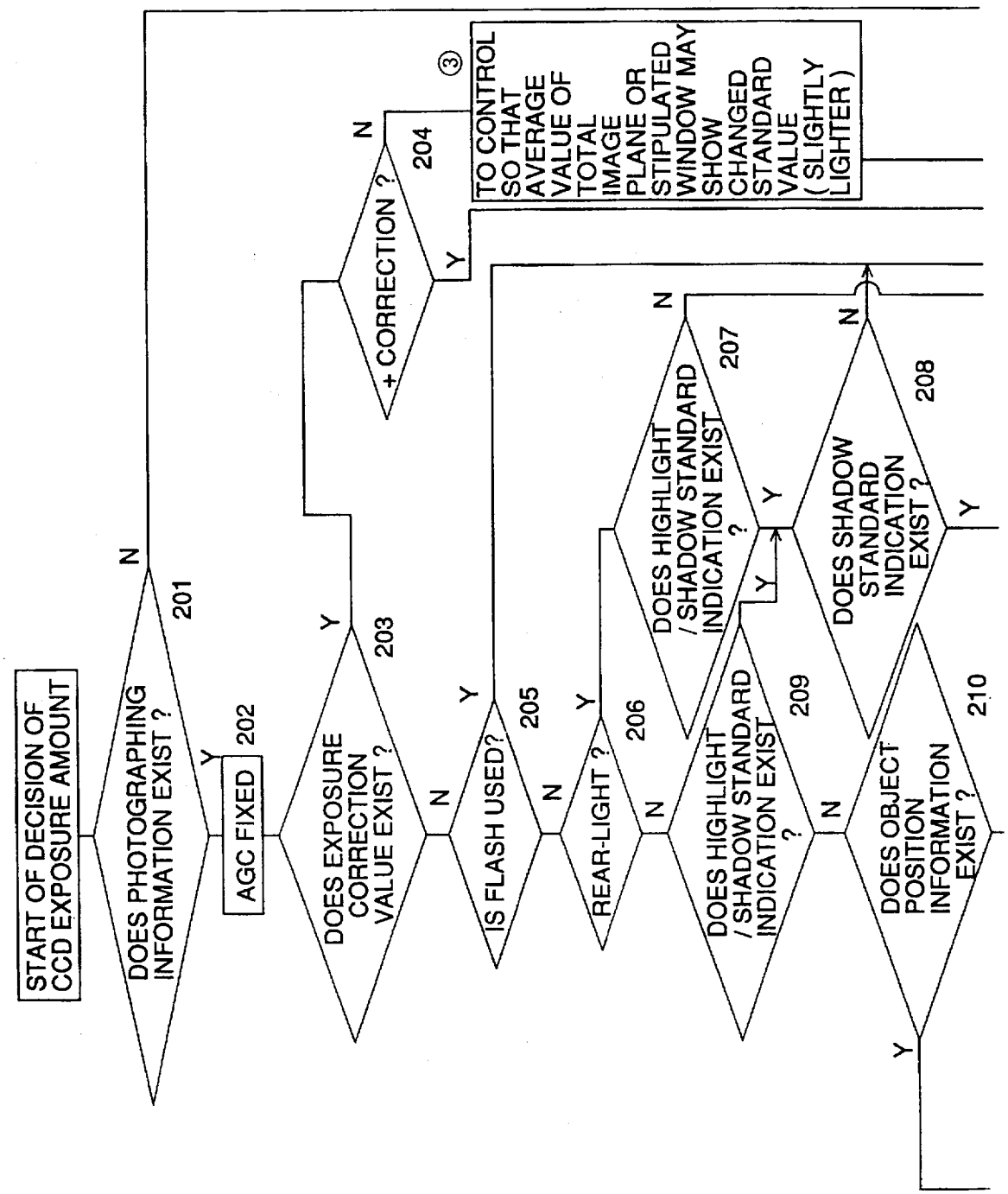
Figure 1:
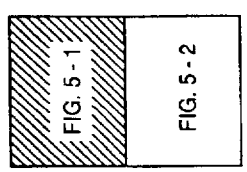
Figures 2, 5:
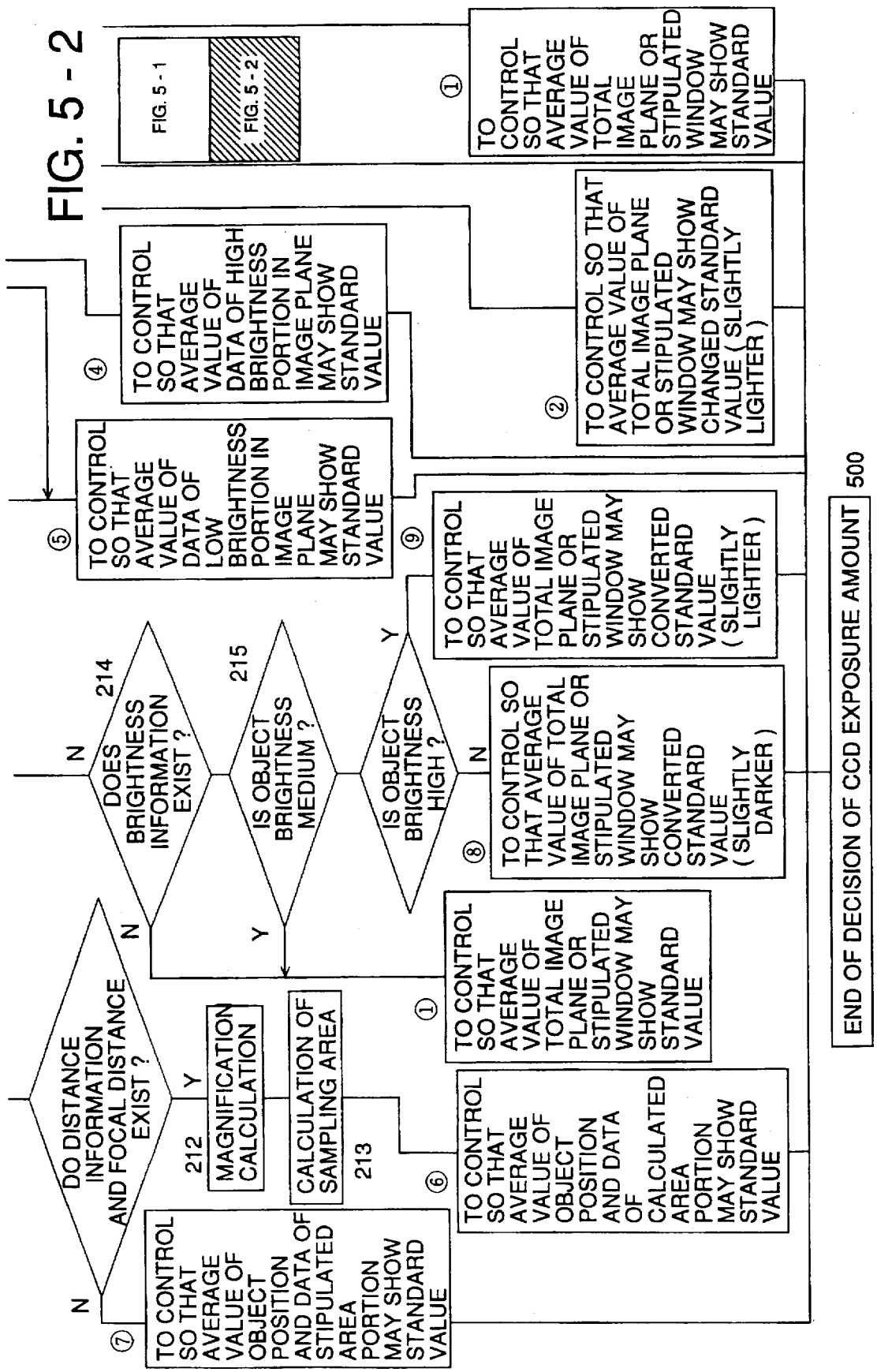

Going back to FIGS. 5-1 and 5-2, when photographing information is available, AGC of AGC amplifier is fixed (202), and whether the exposure correction has been made or not is judged (203). When the exposure correction has been made (Y of 203), whether it is plus correction or it is minus correction is judged (204), and if it plus correction, the sequence advances to ② and the stop or CCD electronic shutter is controlled and an exposure amount is determined. A flow of this control will be explained as follows, referring to a flow chart in FIG. 7.

Figure 7:
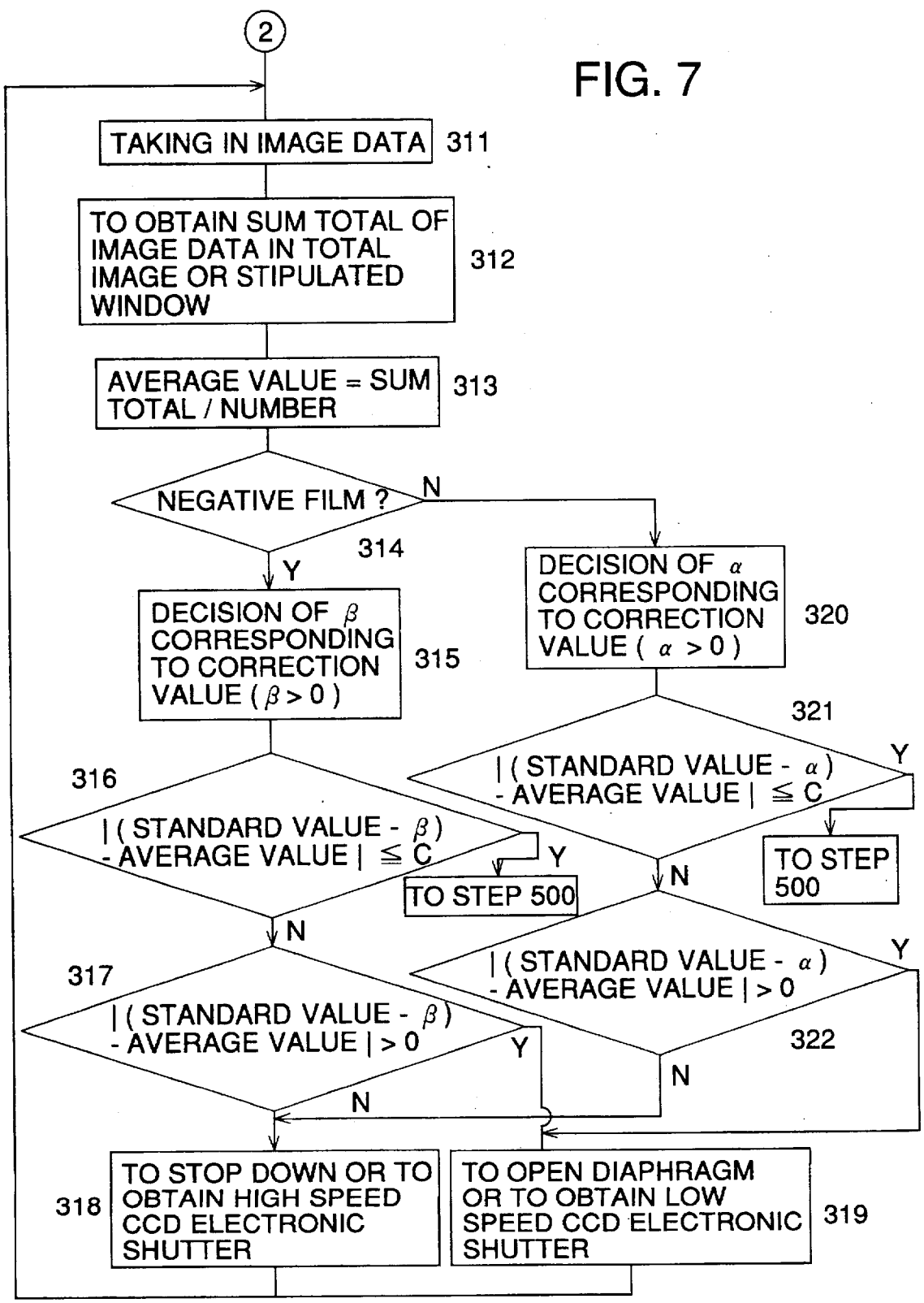
FIG. 7 is a flow chart determining an exposure amount of CCD in the case of positive exposure correction.

In FIG. 7, flow 311–313 is the same as that in FIG. 6. After obtaining an average value of output values, whether a film is a negative film or not is judged (314), and when a negative film is used (Y of 314), value β on circuit calculation corresponding to the exposure correction value is determined (315), and a difference between β and a standard value obtained in advance experimentally is compared with an average value (316). When the difference is smaller than a prescribed value (Y of 316), an exposure amount of CCD is determined without taking any action. However, when the difference is greater than the prescribed value (N of 316), a difference between β and the standard value is compared with an average value (317). When the average value is greater (N of 317), the control is made in the direction to stop down or in the direction toward the higher speed of CCD electronic shutter (318), while when the average value obtained is smaller than the standard value (Y of 317), the control is made in the direction to open the stop or in the direction toward the lower speed of CCD electronic shutter (319).

On the other hand, when no negative film is used, namely when a positive film is used (N of 314), value α on circuit calculation corresponding to the exposure correction value is determined (315), and the sum of the standard value plus α is compared with an average value (321). When the difference is smaller than a prescribed value (Y of 321), an exposure amount of CCD is determined without taking any action. However, when the difference is greater than the prescribed value (N of 321), the sum of the standard value and α is compared with the average value (322). When the average value is greater (N of 322), the control is made in the direction to stop down or in the direction toward the higher speed of CCD electronic shutter (318), while when the average value is smaller than the standard value (Y of 322), the control is made in the direction to open the stop or in the direction toward the lower speed of CCD electronic shutter (319) to control to converge to the standard value.

Figure 8:
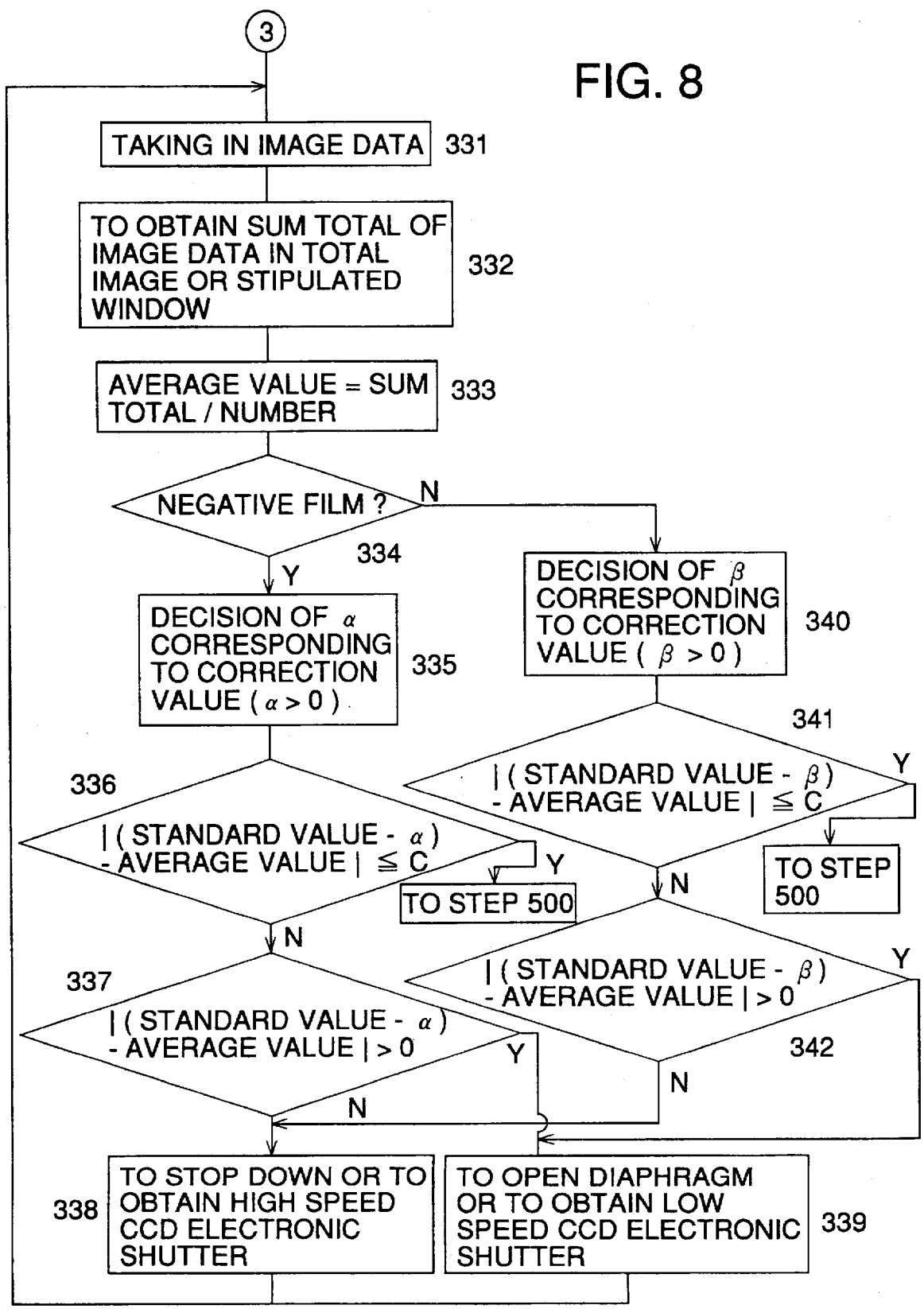
FIG. 8 is a flow chart determining an exposure amount of CCD in the case of negative exposure correction.

As shown in FIG. 5-1, if the correction is minus, the sequence advances to ③ and the stop or CCD electronic shutter is controlled to determine an exposure amount of CCD. A flow of this control is shown on a flow chart in FIG. 8. A flow 331–342 in FIG. 8 is similar to a flow chart in FIG. 7, and explanation is omitted accordingly. However, a different point from that in FIG. 6 is that the standard value is established to be low in the case of a positive film, while the standard value is established to be high in the case of a negative film, so that an exposure amount of CCD may be determined by controlling the stop value or CCD electronic shutter to converge to the standard value.

Incidentally, with regard to an amount of a change from the standard value (α_, β), a value corresponding to an amount of correction for film information can be obtained experimentally.

Further, owing to the image processing mentioned above, it is possible to reproduce on a TV monitor an atmosphere of a subject based on intention of a photographer who changed exposure intentionally.

Figure 9:
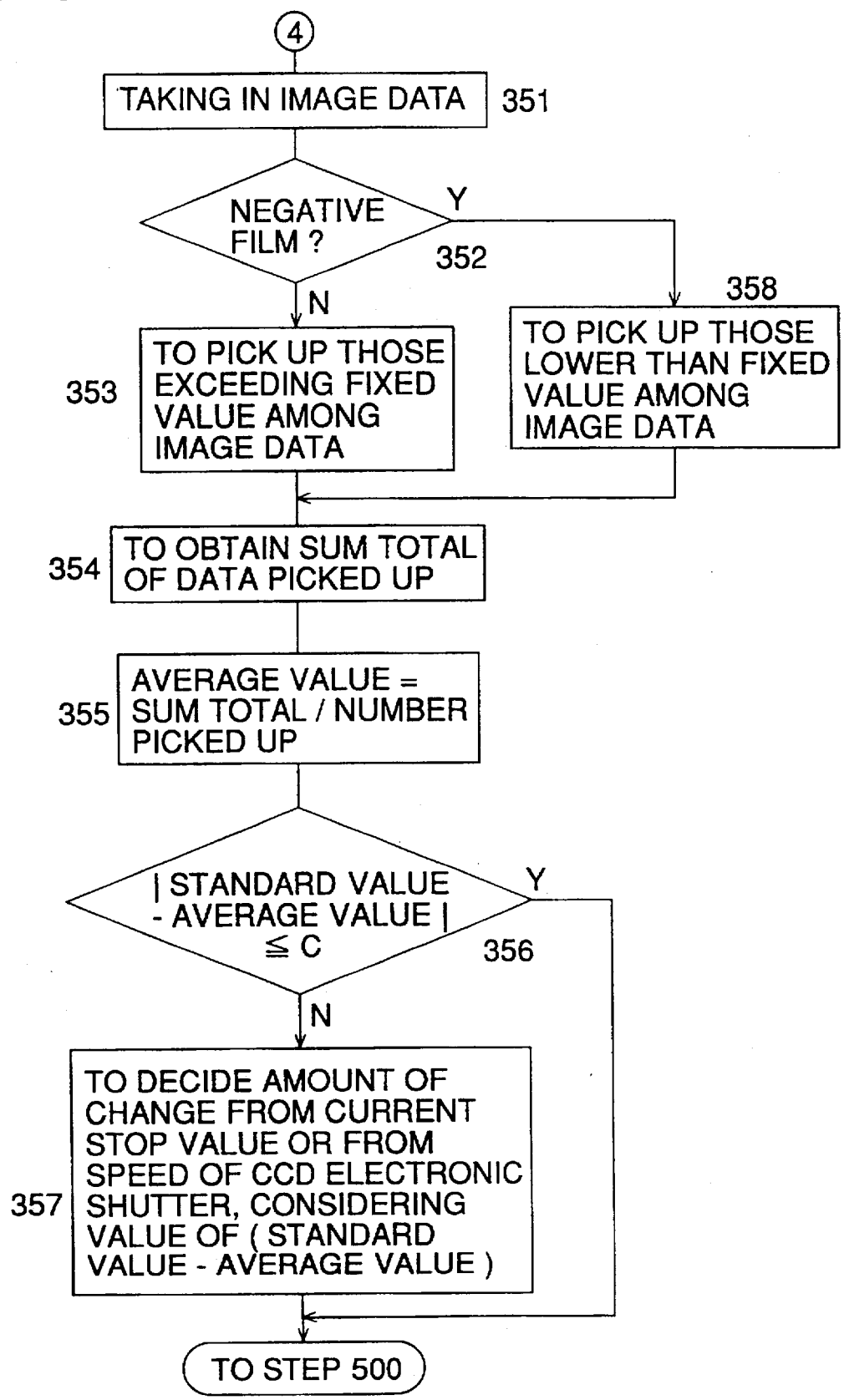
FIG. 9 is a flow chart determining an exposure amount of CCD when an electronic flash is used.

Next, as shown in FIGS. 5-1 and 5-2, when no exposure correction is made (N of 203), whether an electronic flash is used or not is judged (205). When an electronic flash is used (Y of 205), the sequence advances to ④, and an exposure amount of CCD is determined by controlling the stop or CCD electronic shutter. A flow of this control is shown on a flow chart in FIG. 9.

First, image data are taken in (351), and whether a negative film is used or not is judged. When a negative film is not used but a positive film is used (N or 352), only data of high brightness area among image data is read by a built-in comparator (353), the sum total of values of high brightness data is obtained (354), and by dividing the sum total with the number, an average value of high brightness area is obtained (355). When a difference between the standard value and the average value is smaller than a prescribed value, the stop or CCD electronic shutter is controlled without taking any action for determining an exposure amount of CCD. When a difference between the standard value and the average value is larger than a prescribed value, an amount of change from the current stop value or from the current shutter speed of CCD electronic shutter is determined by an absolute value of the difference between the standard value and the average value (357). For example, a sum total of data exceeding 100 is obtained and the sum total is divided with the number to obtain an average value, and the stop or CCD electronic shutter is controlled so that the average value may become the standard value of 128, for example. In this case, the relation between the standard value and the calculated average value makes it possible to determine a stop value or a value of the shutter speed of CCD electronic shutter basically from the stop value or the shutter speed of CCD electronic shutter at the moment of taking in data, which is different from the aforementioned convergence.

When a negative film is used (Y of 352), only data of a low brightness area of a subject among image data is taken out by a built-in comparator (358). For example, an average value is obtained from a sum total of data being less than 150 and the number, and the same processing as in the foregoing is conducted.

Owing to the processing mentioned above, the so-called white spot on a subject in a short distance photographed through the use of an electronic flash can be prevented, making it possible to reproduce more properly.

As shown in FIG. 5-1, when an electronic flash is not used (N of 205), whether there is information of rear-light or not is judged (206). If it is rear-light (Y of 206), whether there is an indication of highlight shadow standard or not is judged (207). When there is an indication (Y of 207), whether it is a shadow standard or not is judged (208). If it is not a shadow standard (N of 208), it is a highlight standard. Therefore, the sequence, in this case, advances to ④ in the same way as the aforesaid case of using an electronic flash, and the same processing is performed. Thereby, it is possible to reproduce with a standard of a highlight area, making it possible to reproduce satisfying an intention of a photographer.

Figure 10:
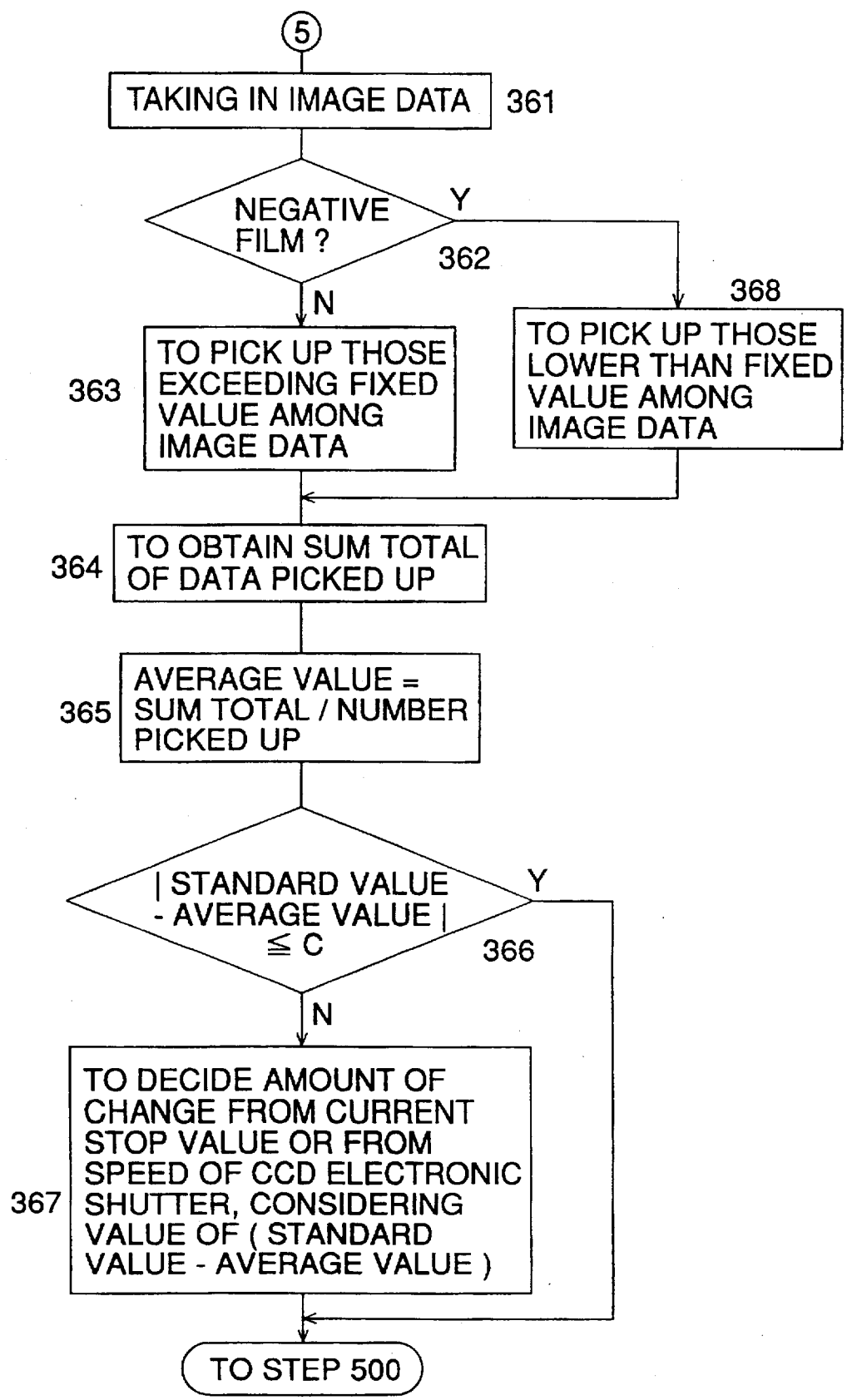
FIG. 10 is a flow chart for determining an exposure amount of CCD when there is no indication for highlight/shadow standard in rear-light, and when there is indication for highlight/shadow standard and shadow standard in the case of no rear-light.

On the other hand, when there is no indication of a highlight shadow standard under rear-light (N of 207), or when there is an indication of a highlight shadow standard under no rear-light (Y of 209) and there is an indication of a shadow standard (Y of 208), the sequence advances to ⑤ and processing which is opposite to that in the case of using an electronic flash is performed. This flow is shown in FIG. 10, and a flow chart in FIG. 10 is similar to that in FIG. 9. The different point is that an average value is obtained from the sum total of data exceeding 100, for example, and the number when a negative film is used (Y of 362), and an average value is obtained from the sum total of data being less than 150, for example, and the number when a positive film is used (N of 362), and the stop or CCD electronic shutter is controlled so that the standard value may be 128, for example.

In this case, again, the relation between the standard value and the average value makes it possible to determine a stop value or a value of the shutter speed of CCD electronic shutter basically from the stop value or the shutter speed of CCD electronic shutter at the moment of taking in data, which is different from the convergence. Owing to this processing, it is possible to prevent that the main subject appears dark in the case of rear-light, and it is further possible to reproduce satisfying an intention of a photographer for the shadow standard.

As shown in FIG. 5-1, when there is no rear-light (N of 206) and no indication of highlight shadow standard (N of 209), the sequence advances further to the next step and whether there is information of a subject position or not is judged (210). When there is information of a subject position (Y of 210), existence of information about a camera-to-subject distance and a focal length is judged (211). When they exist (Y of 211), magnification for photographing is calculated by dividing the camera-to-subject distance with the focal length (212), and an area of a person on a film is calculated by the product of a size of the subject assumed to be a person and the magnification for photographing (213). After that, the sequence advances to ⑥ and this flow chart is shown in FIG. 11.

Figure 11:
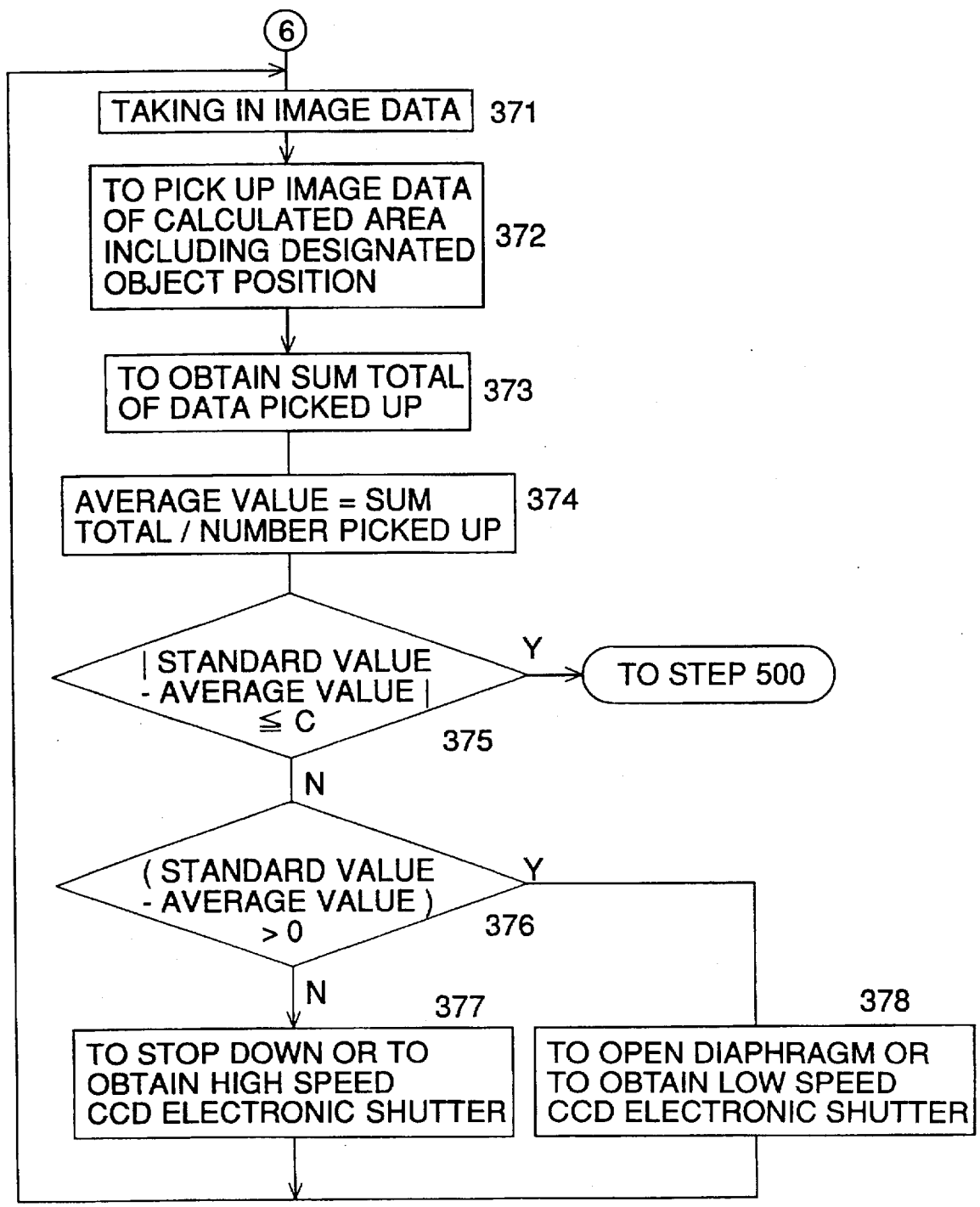
FIG. 11 is a flow chart for determining an exposure amount of CCD in accordance with an area of a subject calculated from a camera-to-subject distance and a focal length.

In FIG. 11, image data are taken in (371), then, from the image data, a subject position and a portion corresponding to a calculated area on a film image plane surrounding the subject are taken out (372), the sum total of the image data taken out is obtained (373), and the sum total is divided with the number and thus an average value of the portion taken out is obtained (374). When a difference between the standard value and the average value is smaller than the prescribed value (Y of 375), the stop or CCD electronic shutter is controlled without taking any action so that an exposure amount of CCD is determined. When a difference between the standard value and the average value is larger than the prescribed value (N of 375), the standard value is compared with the average value (376). When the standard value is smaller than the average value (N of 376), the stop is stopped down or CCD electronic shutter is made to be of higher shutter speed (377), while when the standard value is larger than the average value (Y of 376), the stop is opened or CCD electronic shutter is made to be of higher shutter speed (378), and the stop or CCD electronic shutter is controlled so that the average value may converge to the standard value.

Figure 12:
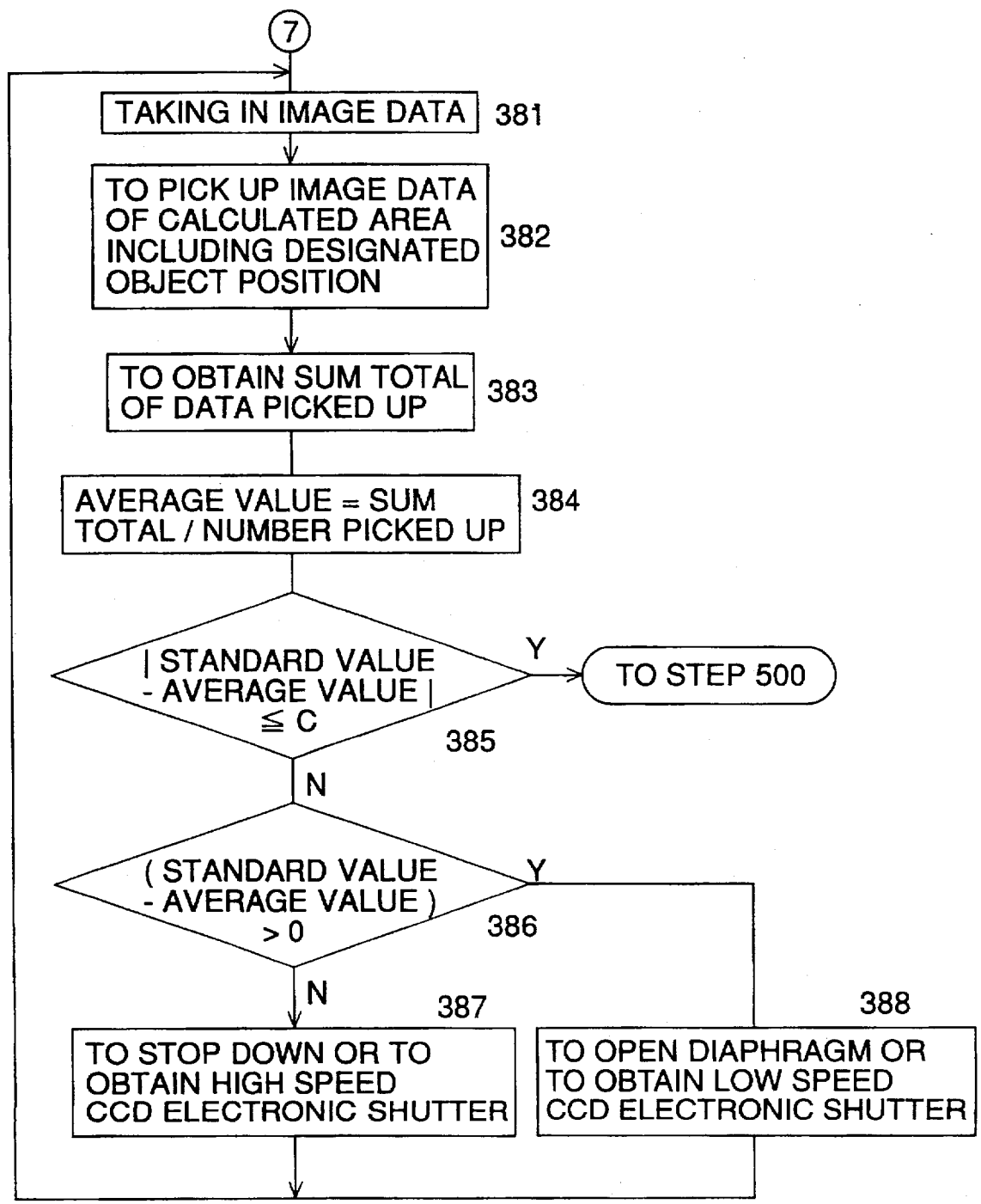
FIG. 12 is a flow chart for determining an exposure amount of CCD when information of a subject position is available but information of a camera-to-subject distance and a focal length are not available.

As shown in FIGS. 5-1 and 5-2, on the other hand, when subject position information exists (Y of 210) and information about a camera-to-subject distance a focal length does not exist (N of 211), the sequence advances to ⑦ and an area on a film image plane is obtained basically (for example, ¼ both sides), then, an average value is obtained through a flow chart in FIG. 12 which is the same as that in FIG. 11 by dividing the sum total of values of CCD image data on a certain area portion on a film image plane including a subject position with the number, and the stop or CCD electronic shutter is controlled so that the average mentioned above may converge to the standard value.

Owing to the processing mentioned above, it is possible to determine accurately the sampling region for determining indication brightness and to reproduce to more appropriate indication brightness.

As shown in FIGS. 5-1 and 5-2; and when there is no information about a subject position (N of 210), the sequence advances further to the next step, and existence of information of subject brightness is judged (214). When there is no information of subject brightness, or when the brightness is medium brightness such as LV7-12, for example, even if it exists (under cloudy sky—under indoor lamp at night), the sequence advances to ① and the same processing as that in FIG. 6 where there is no photographing information is performed.

Figure 13:
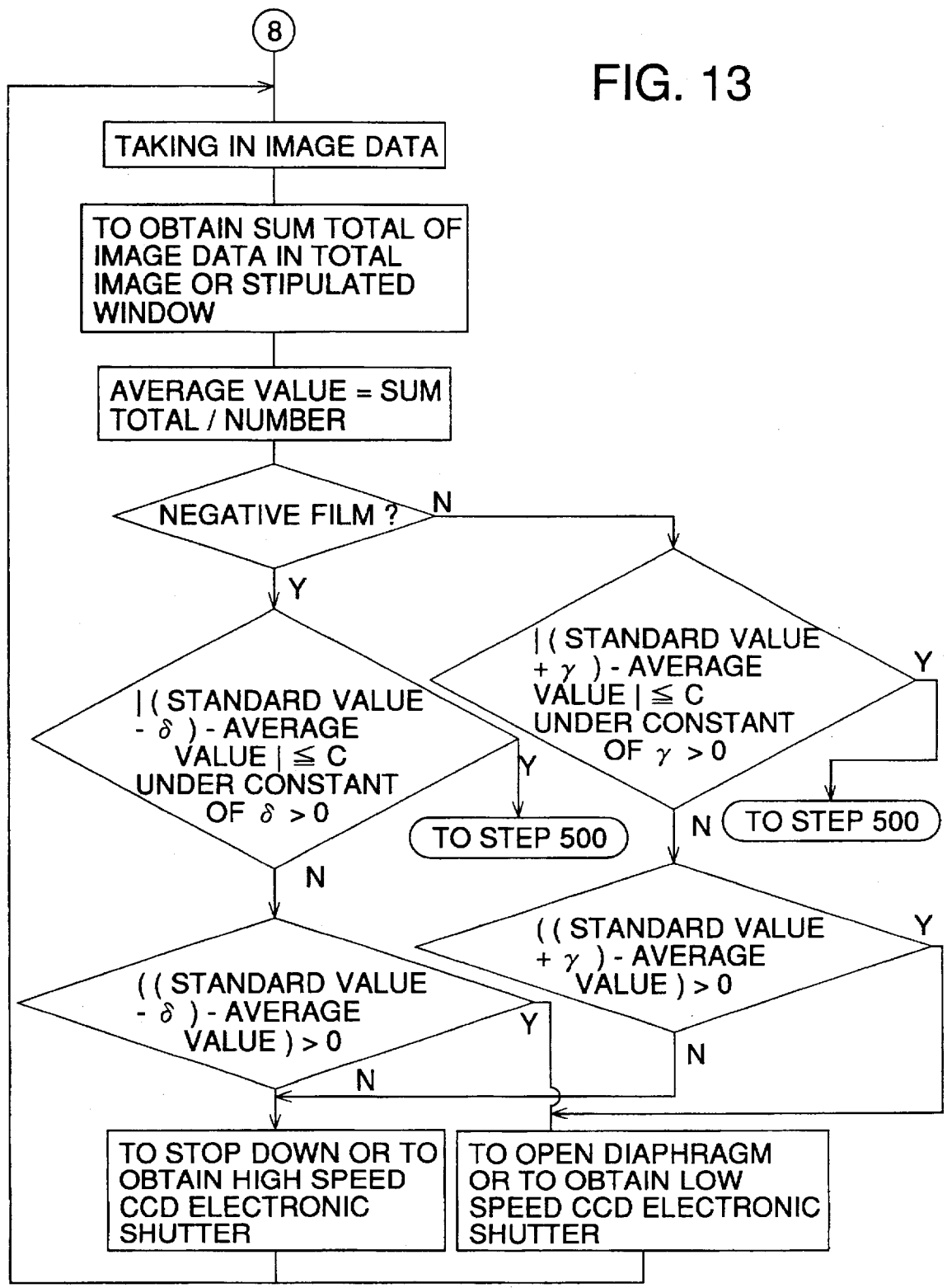
FIG. 13 is a flow chart for determining an exposure amount of CCD in the case of low brightness.

When the subject brightness is neither medium brightness (N of 215) nor high brightness (N of 216), namely when it is low brightness such as LV 7 or lower, the sequence advances to ⑨, and processing of a flow chart shown in FIG. 13 is performed. The flow chart in FIG. 13 is similar to that of minus exposure correction shown in FIG. 8 and its explanation is omitted accordingly, and the standard value is established again basically to be slightly dark.

Figure 14:
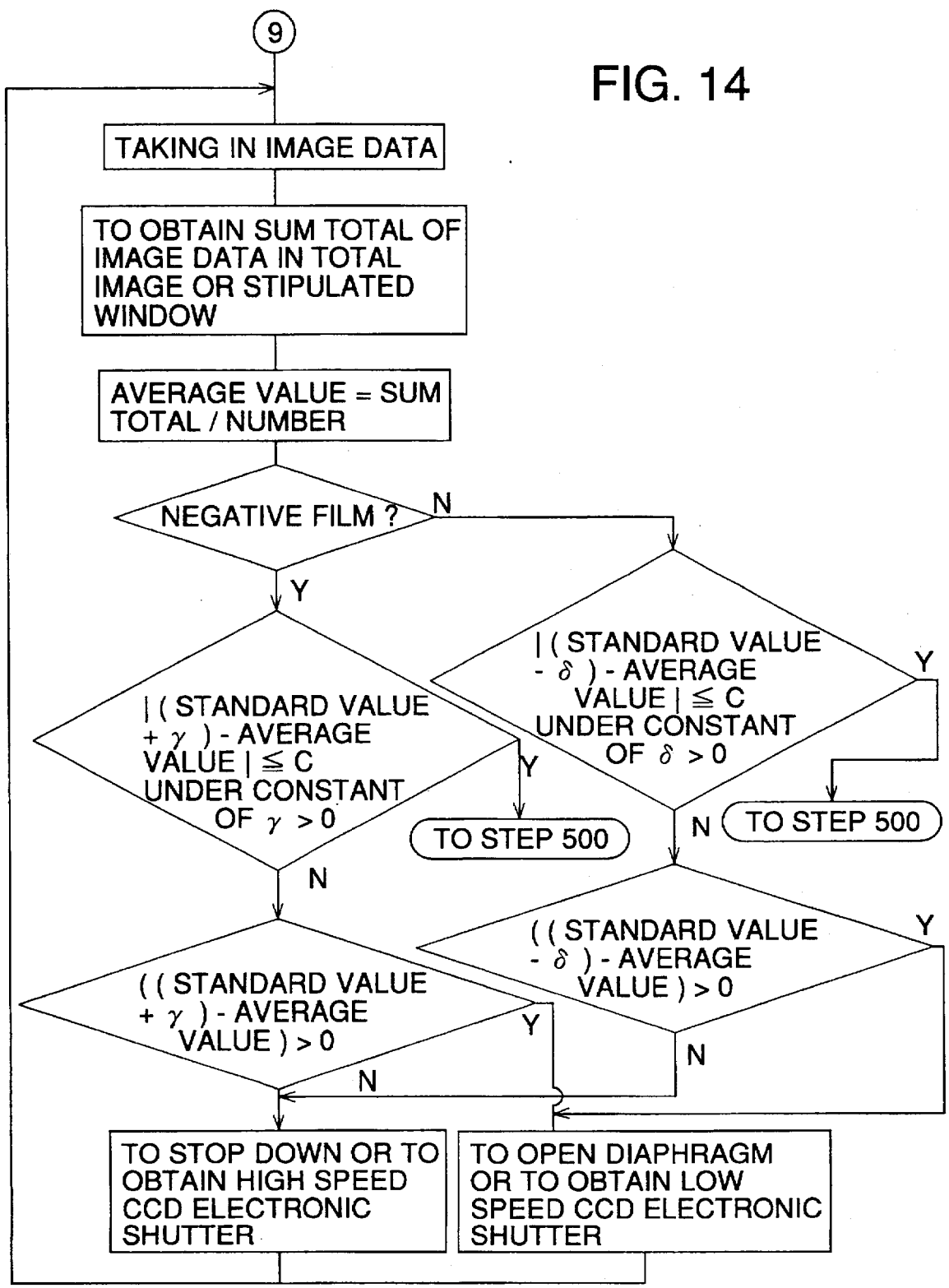
FIG. 14 is a flow chart for determining an exposure amount of CCD in the case of high brightness.

When subject brightness is not medium (N of 215) but is high (Y of 216) such as LV 7 or more, for example, the sequence advances to ⑨ and processing of a flow chart shown in FIG. 14 is performed. The flow chart in FIG. 14 is similar to that of plus exposure correction, and its explanation is omitted accordingly, and the standard value is established again basically to be slightly bright.

Owing to the processing mentioned above, what is photographed in the bright location can be reproduced to be brighter and what is photographed in the dark location is reproduced to be slightly darker, and it is possible to obtain reproduced images wherein atmosphere in photographing is emphasized.

Though it has been explained that each processing mentioned above is performed through each calculation processing of image signal processing section 32 and system controller 40 and through data exchange between them, the processing can also be performed naturally through data exchange between frame memory 37 and system controller 40 and calculation processing thereof.

For discrimination of a negative film and a positive film, a switch for designating negative/positive changeover on operation section 3 may be used, or a known automatic discriminating method to discriminate by measuring a transmission factor of an unexposed portion on a film, for example, may also be used.

After each processing mentioned above, white balance adjustment is made in the following way, for example.

First, average values $R_0$, $G_0$ and $B_0$ of R, G and B signal components included in CCD output within a total image plane or within a stipulated range are obtained.

Namely, $$R_0 = \sum_{i=0}^{n} R_i/n,\ G_0 = \sum_{i=0}^{n} G_i/n,\ B_0 = \sum_{i=0}^{n} B_i/n$$

are calculated, and using these $R_0$, $G_0$ and $B_0$, each pixel is calculated in terms of $$R_1' = (G_0/R_0).R_1,\ G_1' = G_1,\ B_1' = (G_0/B_0).B_1$$

and correction is made.

Through these processings, reproduced images are adjusted in terms of display brightness and hue thereof to be displayed on a TV monitor.

As stated in detail above, in each example of the invention, monitor display similar to a print obtained by utilizing various pieces of photographing information can be obtained by changing and processing the conditions for determining display brightness on a TV monitor through utilization of various photographing information.

As a result, it is possible to enjoy automatically, on a TV monitor, the atmosphere containing an intention for photographing, and it is possible to expect, before printing, a finished print. Therefore, wasteful prints can be avoided. Further, a difference between a finished print and a display on a monitor can be made small as far as possible, resulting in no generation of a sense of incompatibility.

Figure 15:
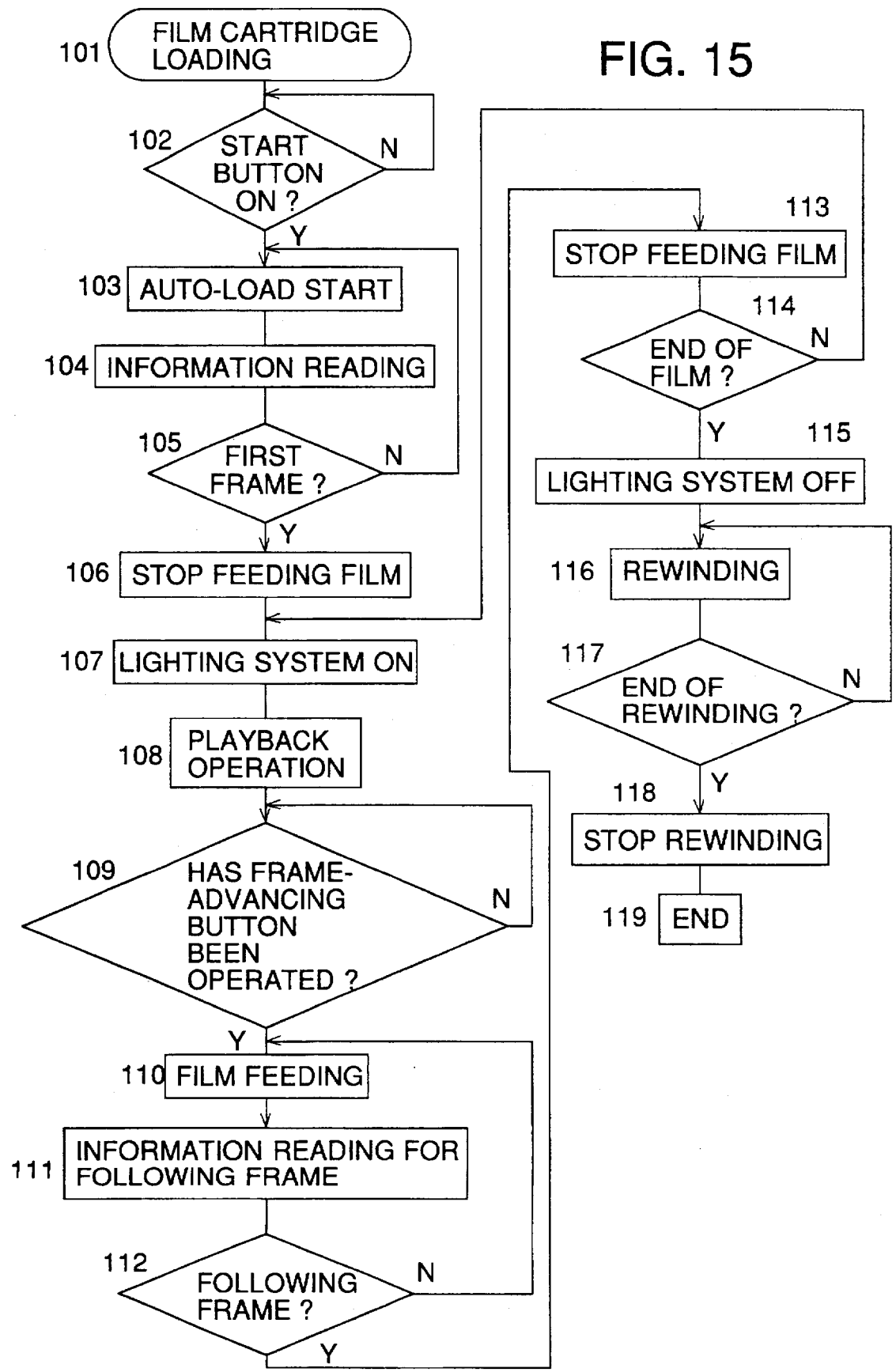
FIG. 15 is a flow chart of basic operations of a film image reproducing apparatus.

Next, a flow for determining an exposure amount of CCD and color correction by means of print information and photographing information, which is the second object of the invention will be explained as follows, referring to a flow chart in FIG. 16. This is included in reproduction operation 108 in FIG. 15.

Figure 16:
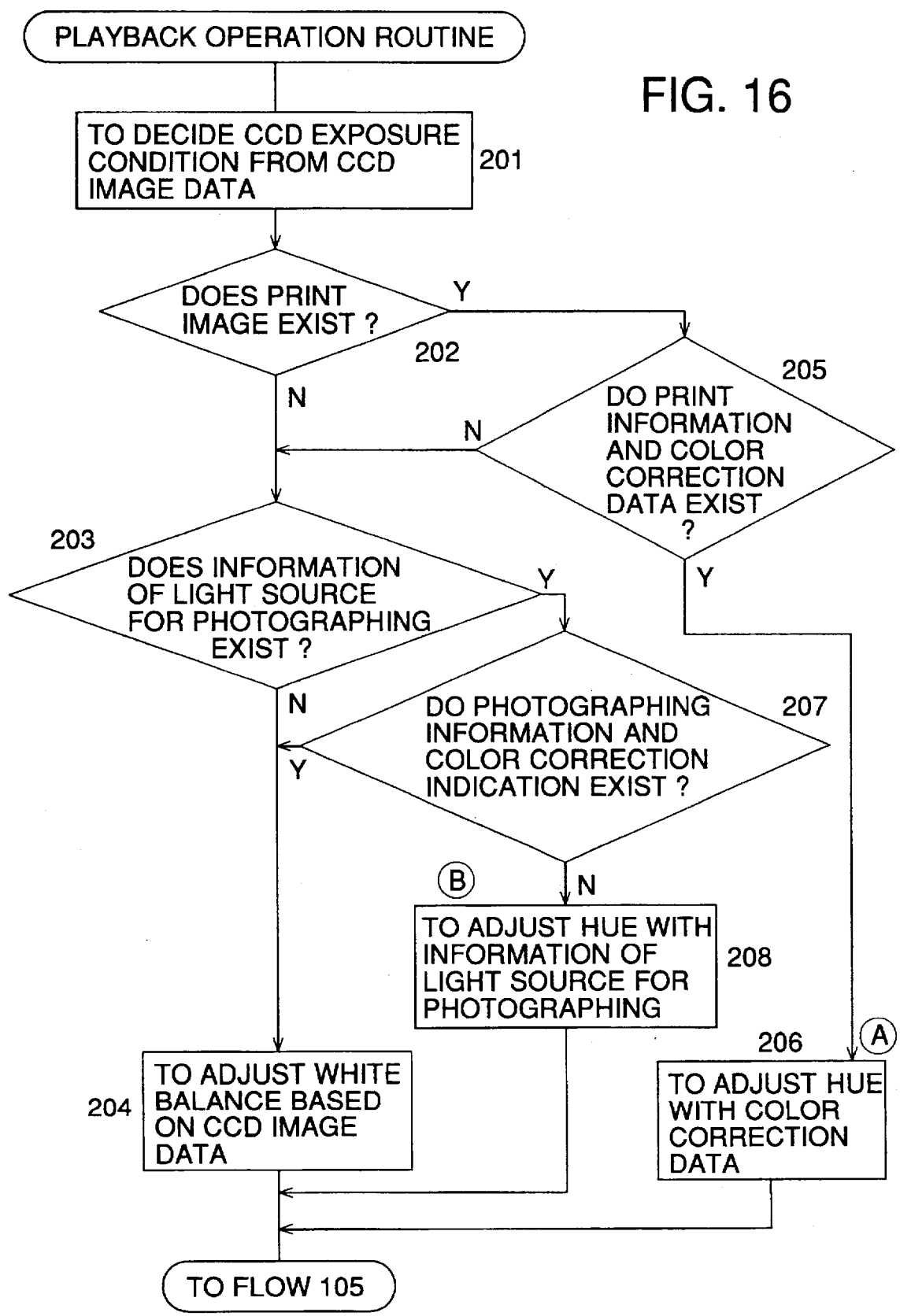
FIG. 16 is a flow chart for determining an exposure amount of CCD and color correction based on photographing information and print information.

In FIG. 16, CCD exposure conditions are determined first from CCD image data (201), and the details of this flow will be explained as follows, referring to a flow chart shown in FIG. 17-1.

Figures 1, 17:
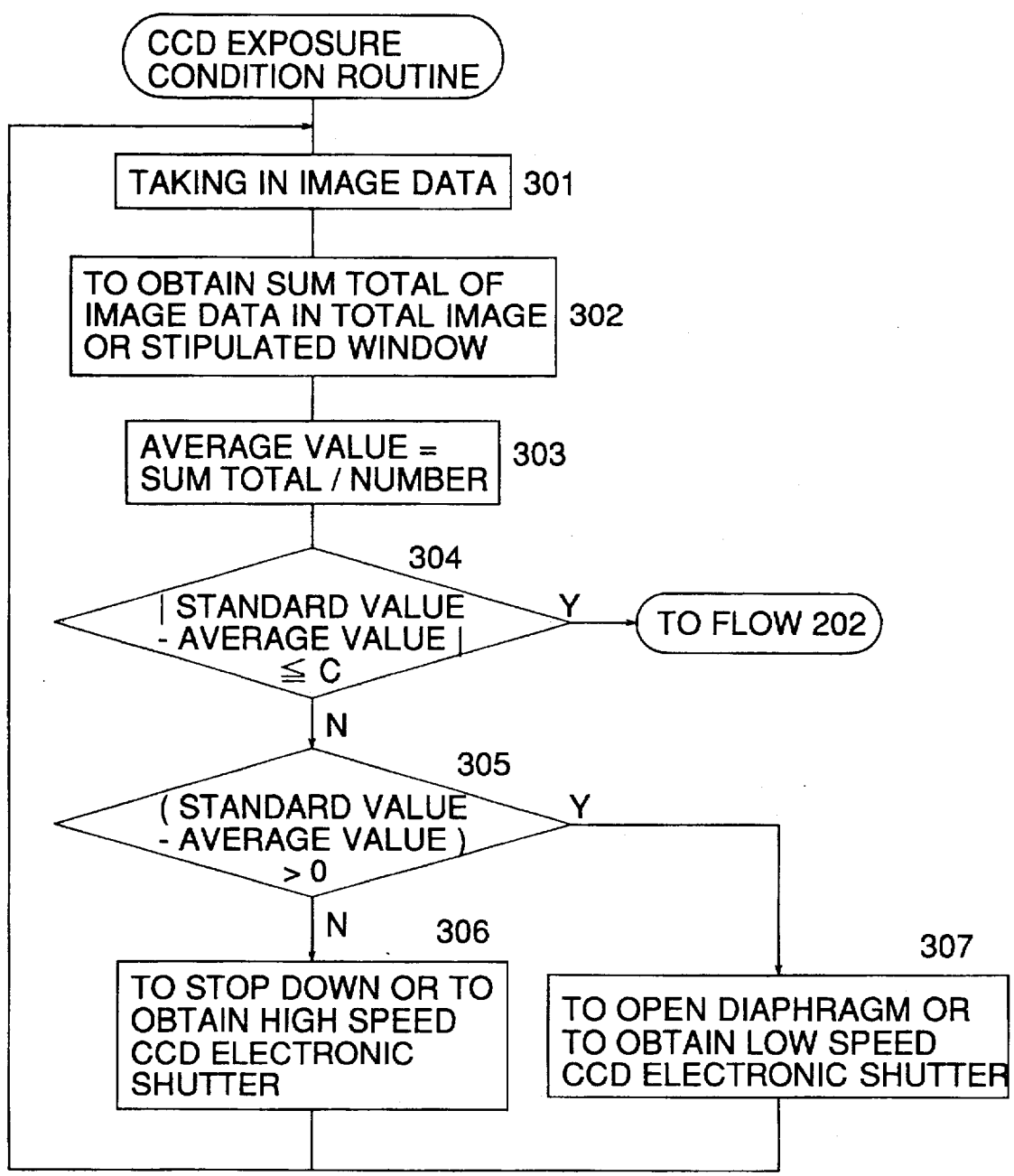
Figures 2, 17:
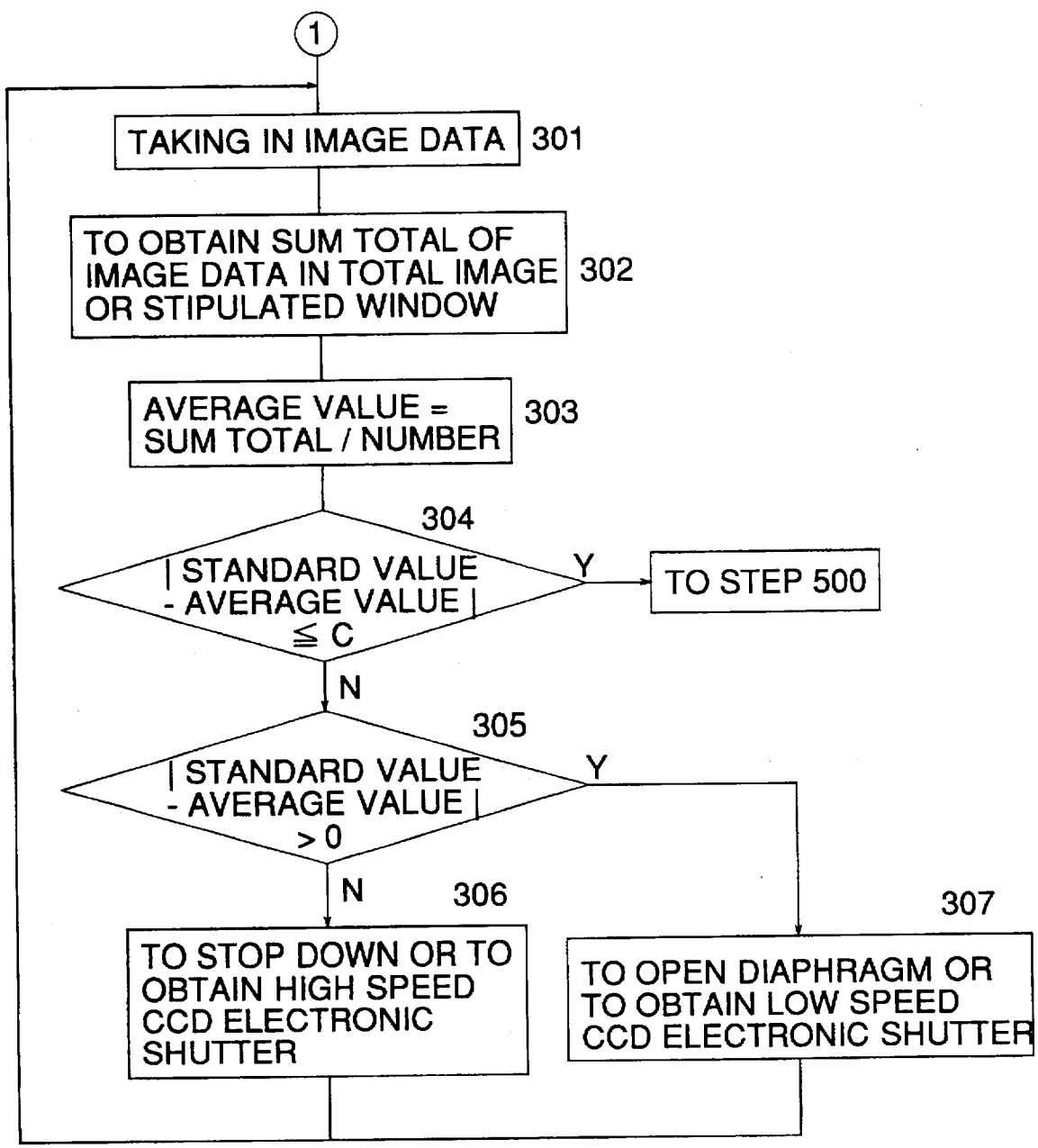

As shown in FIG. 17-1, CCD image data are taken in (301), and the sum total of CCD image data in a total image plane or in a stipulated window is obtained (302). That sum total is divided by the number to obtain an average value of CCD image data (303). When a difference between the average value and the standard value established in advance is smaller than the prescribed value (Y of 304), the sequence advances to flow 202 in FIG. 5-1, while when the difference between the average value and the standard value is larger than the prescribed value (N of 304), the standard value is compared with the average value (305). When the standard value is smaller than the average value (N of 305), the stop is stopped down or CCD electronic shutter is made to be of higher shutter speed (306), while when the standard value is larger than the average value (Y of 305), the stop is opened or CCD electronic shutter is made to be of slower shutter speed (307). In this way, a deviation from the standard value is corrected by the stop or CCD electronic shutter so that convergence to the standard value may be obtained.

Each of CCD image data is expressed with 8 bits, namely with digital data of 0–255 wherein a lower part of an output value is 0, and by dividing the sum total of these values with the number, an average value of output values can be obtained. For example, when the obtained average value is greater than the standard value which is assumed to be 128, the stop is controlled in the direction to stop down or shutter speed of CCD electronic shutter is controlled to be higher. When the obtained average value is smaller than the standard value, the control opposite to the aforesaid control is made so that convergence to the standard value may be obtained.

Calculation and data exchange mentioned above are made between image signal processing section 32 and system controller 40. Further, the following various processings are made similarly.

In a flow in FIG. 16 again, whether there is print information or not is judged (202).

When there is neither print information (N of 202) nor photographing light source information (N of 203), white balance adjustment is made based on CCD image data (204). First, average values $R_0$, $G_0$ and $B_0$ of R, G and B signal components included in CCD output within a total image plane or within a stipulated range are obtained.

Namely, $$R_0 = \sum_{i=0}^{n} R_i/n, \ G_0 = \sum_{i=0}^{n} G_i/n, \ B_0 = \sum_{i=0}^{n} B_i/n \qquad ①$$

are calculated, and using these $R_0$, $G_0$ and $B_0$, each pixel is calculated in terms of $$R_1'=(G_0/R_0).R_1, \ G_1'=G_1, \ B_1'=(G_0/B_0).B_1 \qquad ②$$

and correction is made. Owing to this, white balance adjustment can be done.

Incidentally, other known methods can also be used without being limited to the method above.

On the other hand, when print information is judged to exist (Y of 202), whether the print information contains color correction data or not is judged (205). When it is judged that the color correction data are contained (Y of 205), hue adjustment is made by the color correction data (206). This will be explained by referring to a flow chart shown in FIG. 18.

In FIG. 18, when color correction data in print information represent values of −4−N−4 for each of Y, M and C, for example, color key input on a printer can be converted to a rate of each color of R, G and B by obtaining experimentally in advance each coefficient of R, G and B components for the values mentioned above. In other words, this is a rate of each color of R, G and B which can be expressed on a print. An amount of each component of the converted R, G and B is assumed to be $R_1$, $G_1$ and $B_1$ (301).

Next, matrixes M, M' and M" for each film type obtained in advance experimentally are selected (302), then the selected matrix is used for calculating $R_0$, $G_0$ and $B_0$ (303), and further, these $R_0$, $G_0$ and $B_0$ are used for calculating the following expressions for correction (304).

$$R_1'=(G_0/R_0).R_1, \ G_1'=G_1, \ B_1'=(G_0/B_0).B_1-i \qquad ②$$

Owing to this, color correction of displayed images based on color correction data in print information can be done.

Incidentally, although matrixes for various film types are prepared in the above example, it is also possible to use one averaged matrix for substitution.

It is further possible to prepare a matrix corresponding to the specific function key of a printer.

Owing to the foregoing, even in a film image reproducing apparatus, a decline of color balance and color failure caused by different light sources can be improved automatically based on data of an amount of correction made on a printer. Namely, by utilizing print information of a printer, it is possible to use for a film image reproducing apparatus the highly reliable information determined by algorism which is more accurate than photographing information, and subjects which are subjected to various correction such as the beach in summer, a bridal pair backing on a gold-leafed folding screen, persons on a lawn, under a fluorescent lamp, and under tungsten light can easily be reproduced properly without preparing a judgment algorism.

On the other hand, when there is no color correction data in print information (N of 205), whether there is information of a photographing light source or not is judged (203). When there is information of a photographing light source (Y of 203), whether there is indication for color correction in photographing information that is an intention of a photographer or not is judged (207). When there is indication for color correction (Y of 207), the sequence advances to flow 204, and processing that is the same as the foregoing is performed.

Figure 19:
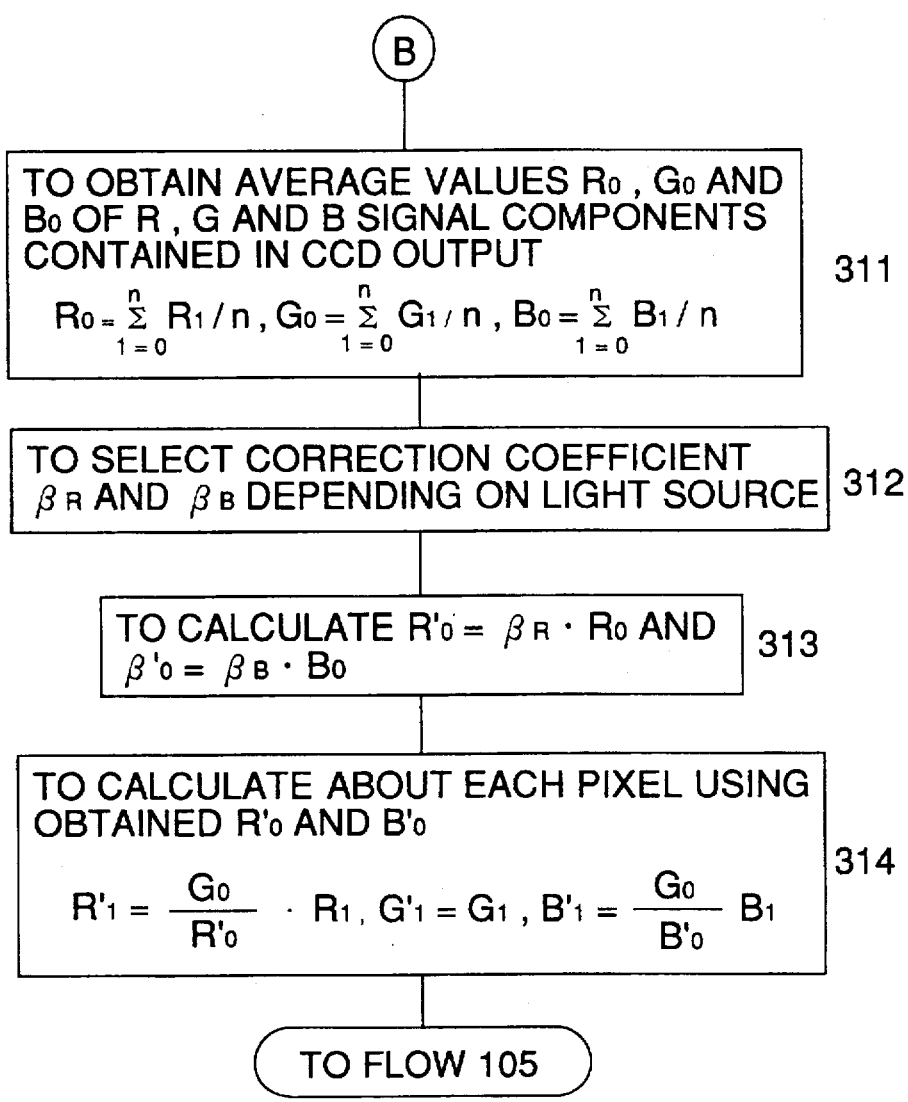
FIG. 19 is a flow chart for conducting hue adjustment based on photographing light source information.

When there is no indication of color correction (N of 207), hue adjustment is conducted by means of photographing light source information (208). This will be explained as follows, referring to a flow chart shown in FIG. 19.

First, average values $R_0$, $G_0$ and $B_0$ of R, G and B signal components included in CCD output are obtained (311), which is the same as numerical expression ①. Next, correction coefficients obtained experimentally in advance from light source information are selected (312). This varies depending on height of color temperature of a light source, representing a coefficient having the relation of $\beta_R > 1 > \beta_B$ when the color temperature is low such as in tungsten light, and representing a coefficient having the relation of $\beta_R < 1 < \beta_B$ when the color temperature of a light source is low. By using this coefficient, the average values $R_0$, $G_0$ and $B_0$ are corrected (313), and obtained $R_0'$ and $B_0'$ are used to perform correction calculation for each pixel (314).

Owing to the foregoing, an atmosphere harmonized with color temperature of a light source can be reproduced. Namely, when there is no print information, light source information in photographing information makes it possible to realize natural reproduction with an atmosphere harmonized with color temperature of a light source.

In the invention, print information which is more reliable than those used for printing is used with priority to information recorded on a film for hue adjustment. Therefore, a difference from a print can be reduced to the utmost.

Further, a film image reproducing apparatus can reproduce simply an atmosphere harmonized with a light source without requiring a high-grade algorism such as that provided on a printer.

What is claimed is:

1. An apparatus for reproducing a photographed image on each frame of developed photographic roll film, wherein each frame includes an image region on which the photographed image is provided and a memory region in which information regarding the photographed image is stored, comprising:
- an image reader for photoelectrically reading the photographed image on the image region and for outputting image signals;
- an information reader for reading the information stored in the memory region, the information including photographing information provided at the time of photographing a subject image, the photographing information being brightness information for the photographed image;
- a processing circuit for processing the image signals based on the brightness information; and
- a monitor having a screen for displaying an image corresponding to the processed image signals on the screen, the processing circuit changing brightness of the displayed image on the screen in accordance with the brightness of the photographed image,
- wherein when the brightness of the photographed image is a middle brightness, the brightness of the photographed image is used as reference brightness for the displayed image, wherein when the brightness of the photographed image is a high brightness, the brightness of the displayed image is set higher than the reference brightness, and wherein when the brightness of the photographed image is a low brightness, the brightness of the displayed image is set lower than the reference brightness.

2. An apparatus for reproducing a photographed image on each frame of developed photographic roll film, wherein each frame includes an image region on which the photographed image is provided and a memory region in which information regarding the photographed image is stored, comprising:
- an image reader for photoelectrically reading the photographed image on the image region and for outputting image signals;
- an information reader for reading the information stored in the memory region, the information including photographing information provided at the time of photographing a subject image, the photographing information being exposure correction amount information for the photographed image;
- a processing circuit for processing the image signals based on the photographing information; and
- a monitor having a screen for displaying an image corresponding to the processed image signals, the processing circuit processing the image signals so as to change brightness of the displayed image on the screen in accordance with the exposure correction amount for the photographed image, and
- wherein when the exposure correction amount for the photographed image is zero, brightness of the photographed image is used as reference brightness for the displayed image, wherein when the exposure correction amount of the photographed image is positive, the brightness of the displayed image is set higher than the reference brightness, and wherein when the brightness of the photographed image is negative, the brightness of the displayed image is set lower than the reference brightness.

3. An apparatus for reproducing a photographed image on each frame of developed photographic roll film, wherein each frame includes an image region on which the photographed image is provided and a memory region in which information regarding the photographed image is stored, comprising:
- an image reader for photoelectrically reading the photographed image on the image region and for outputting image signals;
- an information reader for reading the information stored in the memory region, the information including photographing information provided at the time of photographing a subject image, the photographing information being exposure correction amount information for the photographed image;
- a processing circuit for processing the image signals based on the photographing information;
- a monitor having a screen for displaying an image corresponding to the processed image signals, the processing circuit processing the image signals so as to change brightness of the displayed image on the screen in accordance with the exposure correction amount for the photographed image; and
- a controller for controlling priority of the information, the controller prioritizing the exposure correction amount so as to to determine the brightness of the displayed image in precedence to other information.

4. An apparatus for reproducing a photographed image on each frame of developed photographic roll film, wherein each frame includes an image region on which the photographed image is provided and a memory region in which information regarding to the photographed image is stored, comprising:
- an image reader for photoelectrically reading the photographed image on the image region and for outputting image signals;
- an information reader for reading the information stored in the memory region, the information including photographing information provided at the time of photographing a subject image and being related to use of a strobe during photographing of the photographed image;
- a processing circuit for processing the image signals based on the information; and a monitor having a screen for displaying an image corresponding to the processed image signals, wherein when the photographed image is photographed with the use of the strobe, the processing circuit processes the image signals so as to extract a high brightness region from the photographed image and determine brightness of the displayed image on the screen on the basis of brightness of the high brightness region of the photographed image.

5. An apparatus for reproducing a photographed image on each frame of developed photographic roll film, wherein each frame includes an image region on which the photographed image is provided and a memory region in which information regarding the photographed image is stored, comprising:

an image reader for photoelectrically reading the photographed image on the image region and for outputting image signals;

an information reader for reading the information stored in the memory region, the information including photographing information provided at the time of photographing a subject image;

a processing circuit for processing the image signals based on the information; and a monitor having a screen for displaying an image corresponding to the processed image signals, wherein when the photographing information includes at least one of rear light information and highlight/shadow standard indication information, the processing circuit processes the image signals so as to extract a high brightness region or a low brightness region from the photographed image and determine brightness of the displayed image on the screen on the basis of brightness of the high brightness region or the low brightness region.

6. An apparatus for reproducing a photographed image on each frame of developed photographic roll film, wherein each frame includes an image region on which the photographed image is provided and a memory region in which information regarding the photographed image is stored, comprising:

an image reader for photoelectrically reading the photographed image on the image region and for outputting image signals;

an information reader for reading the information stored in the memory region, the information including photographing information provided at the time of photographing a subject image;

a processing circuit for processing the image signals based on the information; and a monitor having a screen for displaying an image corresponding to the processed image signals, wherein when the photographing information includes position information related to position of the subject image in the image region, the processing circuit processes the image signals so as to extract the subject image from the photographed image and determine brightness of the displayed image on the screen on the basis of the subject image.

7. The apparatus of claim 6, wherein when the position information includes information as to the subject image and lens focal distance information, a photographing magnification is obtained from the distance to the subject and the lens focal distance, the area of the subject image on the image region is calculated, the image signals of the subject image are extracted, and the brightness of the displayed image is determined on the basis of the extracted subject image.

8. An apparatus for reproducing a photographed image on each frame of developed photographic roll film, wherein each frame includes an image region on which the photographed image is provided and a memory region in which information regarding the photographed image, is stored, comprising:

an image reader for photoelectrically reading the photographed image on the image region and for outputting image signals;

an information reader for reading the information stored in the memory region, the information including printing information provided at the time of printing the photographed image on each frame of the developed photographic roll film;

a processing circuit for processing the image signals based on the information; and a monitor having a screen for displaying an image corresponding to the processed image signals.

9. The apparatus of claim 8, wherein the printing information is color correction information, and the processing circuit processes the image signals so as to adjust the hue of the displayed image on the screen in accordance with the color correction information.

10. An apparatus for reproducing a photographed image on each frame of developed photographic roll film, wherein each frame includes an image region on which the photographed image is provided and a memory region in which information regarding the photographed image is stored, comprising:

an image reader for photoelectrically reading the photographed image on the image region and for outputting image signals;

an information reader for reading the information stored in the memory region, the information including color correction information at the time of printing or light source information at the time of photographing;

a processing circuit for processing the image signals based on the information; and a monitor having a screen for displaying an image corresponding to the processed image signals, the processing circuit processing the image signals so as to adjust hue of the displayed image in accordance with the information.

11. An apparatus for reproducing a photographed image on each frame of developed photographic roll film, wherein each frame includes an image region on which the photographed image is provided and a memory region in which information regarding the photographed image is stored comprising:

an image reader for photoelectrically reading the photographed image on the image region and for outputting image signals;

an information reader for reading the information stored in the memory region, the information including both color correction information at the time of printing and light source information at the time of photographing;

a processing circuit for processing the image signals based on the information; and a monitor having a screen for displaying an image corresponding to the processed image signals, the processing circuit processing the image signals so as to adjust hue of the displayed image in accordance with the color correction information and the light source information.

* * * * *

UNITED STATES PATENT AND TRADEMARK OFFICE
CERTIFICATE OF CORRECTION

PATENT NO. : 5,748,287
DATED : May 05, 1998
INVENTOR(S) : Yoshiharu TAKAHASHI et al.

It is certified that error appears in the above-indentified patent and that said Letters Patent is hereby corrected as shown below:

In Claim 3, Column 16, line 49, delete "to" (second occurrence)

In claim 8, Column 18, line 5, after "image", delete ",".

In claim 11, Column 18, line 49, after "stored", insert --,--.

Signed and Sealed this

Twenty-fourth Day of November, 1998

Attest:

BRUCE LEHMAN

Attesting Officer

Commissioner of Patents and Trademarks